(12) United States Patent
Kinoshita et al.

(10) Patent No.: US 9,878,769 B2
(45) Date of Patent: Jan. 30, 2018

(54) WATERCRAFT

(71) Applicant: Yamaha Hatsudoki Kabushiki Kaisha, Iwata-shi, Shizuoka (JP)

(72) Inventors: Yoshimasa Kinoshita, Shizuoka (JP); Shu Akuzawa, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 0 days.

(21) Appl. No.: 15/158,871

(22) Filed: May 19, 2016

(65) Prior Publication Data

US 2016/0264227 A1    Sep. 15, 2016

Related U.S. Application Data

(62) Division of application No. 13/662,715, filed on Oct. 29, 2012, now abandoned.

(30) Foreign Application Priority Data

| Oct. 31, 2011 | (JP) | ................................ | 2011-239144 |
| Nov. 10, 2011 | (JP) | ................................ | 2011-246688 |
| Nov. 10, 2011 | (JP) | ................................ | 2011-246689 |
| Nov. 10, 2011 | (JP) | ................................ | 2011-246690 |

(51) Int. Cl.
  *B60L 3/00* (2006.01)
  *B60L 15/00* (2006.01)
  (Continued)

(52) U.S. Cl.
  CPC ............ *B63H 25/02* (2013.01); *B63B 49/00* (2013.01); *G05D 1/0011* (2013.01); *G05D 1/0206* (2013.01); *G06F 3/0346* (2013.01); *G06F 3/041* (2013.01); *G06F 3/0481* (2013.01); *B63B 39/061* (2013.01); *B63H 21/21* (2013.01); *B63H 2021/216* (2013.01); *B63H 2025/028* (2013.01); *B63J 2099/006* (2013.01)

(58) Field of Classification Search
  USPC .......................................................... 701/21
  See application file for complete search history.

(56) References Cited

U.S. PATENT DOCUMENTS 5,054,569 A * 10/1991 Scott .................... F02N 11/0807
                                                      123/179.2
5,167,550 A * 12/1992 Nielsen ................. B63B 35/731
                                                      114/253

(Continued)

FOREIGN PATENT DOCUMENTS

| EP | 1623875 A1 * | 2/2006 |
| WO | 2006/061864 A1 | 6/2006 |
| WO | 2008/109778 A2 | 9/2008 |

OTHER PUBLICATIONS

Kinoshita et al., "WATERCRAFT", U.S. Appl. No. 13/662,715, filed Oct. 29, 2012.

*Primary Examiner* — Jean Paul Cass
(74) *Attorney, Agent, or Firm* — Keating and Bennett, LLP

(57) ABSTRACT

A watercraft includes a plurality of devices, a central controller, and a display device. The central controller is programmed to execute centralized control of the devices. The display device includes a touch panel function. The display device is configured to communicate with the central controller, and to display information regarding watercraft in a Graphical User Interface (GUI) format.

3 Claims, 25 Drawing Sheets

(51) Int. Cl.
  *G05D 1/00*     (2006.01)
  *G05D 3/00*     (2006.01)
  *G05F 7/00*     (2006.01)
  *G06F 17/00*    (2006.01)
  *B63H 25/02*    (2006.01)
  *B63B 49/00*    (2006.01)
  *G05D 1/02*     (2006.01)
  *G06F 3/0346*   (2013.01)
  *G06F 3/041*    (2006.01)
  *G06F 3/0481*   (2013.01)
  *B63H 21/21*    (2006.01)
  *B63J 99/00*    (2009.01)
  *B63B 39/06*    (2006.01)

(56) References Cited

U.S. PATENT DOCUMENTS

| | | | | |
|---|---|---|---|---|
| 5,353,730 A * | 10/1994 | Talbot | | B63B 35/40 |
| | | | | 114/248 |
| 6,691,807 B1 * | 2/2004 | Bhavsar | | B60K 6/24 |
| | | | | 180/65.21 |
| 8,489,627 B1 * | 7/2013 | Brandt | | G06F 17/30277 |
| | | | | 707/765 |
| 8,706,802 B1 * | 4/2014 | Dayan | | G06F 17/30905 |
| | | | | 345/632 |
| 9,317,534 B2 * | 4/2016 | Brandt | | G06F 17/30277 |
| 9,534,906 B2 * | 1/2017 | High | | B66F 9/063 |
| 9,610,957 B2 * | 4/2017 | Baalu | | B60W 50/08 |
| 2003/0117261 A1 * | 6/2003 | Gunsch | | G07C 9/00182 |
| | | | | 340/5.25 |
| 2004/0104557 A1 * | 6/2004 | Kaepp | | B60D 1/485 |
| | | | | 280/495 |
| 2004/0118884 A1 * | 6/2004 | Ford | | B60R 9/10 |
| | | | | 224/310 |
| 2005/0006870 A1 * | 1/2005 | Williams | | B60R 3/02 |
| | | | | 280/166 |
| 2005/0124234 A1 * | 6/2005 | Sells | | B63H 21/24 |
| | | | | 440/33 |
| 2005/0206224 A1 * | 9/2005 | Lu | | B60T 7/12 |
| | | | | 303/7 |
| 2005/0206225 A1 * | 9/2005 | Offerle | | B60T 8/1706 |
| | | | | 303/7 |
| 2005/0212749 A1 * | 9/2005 | Marvit | | G06F 1/1613 |
| | | | | 345/156 |
| 2006/0029255 A1 * | 2/2006 | Ozaki | | B60R 1/00 |
| | | | | 382/104 |
| 2006/0089794 A1 * | 4/2006 | DePasqua | | G01C 21/203 |
| | | | | 701/532 |
| 2009/0322697 A1 * | 12/2009 | Cao | | G06F 3/0416 |
| | | | | 345/173 |
| 2010/0157061 A1 * | 6/2010 | Katsman | | G07C 5/008 |
| | | | | 348/149 |
| 2011/0043656 A1 * | 2/2011 | Tanaka | | G06K 9/00664 |
| | | | | 348/222.1 |
| 2012/0114171 A1 * | 5/2012 | Newman | | G06K 9/3233 |
| | | | | 382/103 |
| 2014/0130126 A1 * | 5/2014 | Jakobsson | | H04L 63/08 |
| | | | | 726/3 |
| 2014/0172197 A1 * | 6/2014 | Ganz | | G08C 17/02 |
| | | | | 701/2 |
| 2014/0313343 A1 * | 10/2014 | Frank | | H04N 5/33 |
| | | | | 348/164 |

* cited by examiner

WATERCRAFT

BACKGROUND OF THE INVENTION

1. Field of the Invention

The present invention relates to a watercraft.

2. Description of the Related Art

Watercrafts are equipped with a variety of devices supporting the functions of the watercraft. For example, the watercraft disclosed in Laid-open Japanese Patent Application No. 2007-83767 is equipped with two outboard motors and a remote control device. The watercraft also includes electric powered steering devices, operating switches, and instrument panels corresponding to each of the outboard motors. Each of these devices includes a controller and the controllers of related devices are connected to one another to define a network system of devices inside the watercraft. More specifically, an electric powered steering device, an operating switch, and an instrument panel is provided with respect to each of two outboard motors, and is connected to each of the controllers of the two outboard motors. The controller of the remote control device is connected to the controllers of the two outboard motors.

As explained above, in recent years watercraft include a plurality of controllers in addition to the controller for the engine. Thus, the number of controllers increases as the number of devices increases. Consequently, as the number of devices increases, the network system becomes more complex and the wiring connecting the devices becomes more complex. Also, as the number of operating switches and instrument panels increases, more work is required to install each of these devices. Additionally, having a large number of operating switches and instrument panels makes it more difficult for an operator to recognize information regarding the watercraft and causes the ease of operability to decline.

SUMMARY OF THE INVENTION

A first preferred embodiment of the present invention provides a watercraft with which it is easier to arrange a network system of devices and which enables the operability to be improved.

A watercraft according to the first preferred embodiment of the present invention includes a plurality of devices, a central controller, and a display device. The central controller is programmed to execute centralized control of the devices. The display device preferably includes a touch panel function. The display device is arranged to communicate with the central controller, and display information regarding the watercraft in a Graphical User Interface (GUI) format, for example.

A watercraft according to a modification of the first preferred embodiment of the present invention includes a plurality of devices and a central control unit. The central control unit is an apparatus that incorporates a central controller and a display device into a single unit. The central controller is programmed to execute centralized control of the devices. The display device is arranged to communicate with the central controller and display information regarding watercraft in a GUI format, for example.

Preferably, the devices are centrally controlled by the central controller. Consequently, it is easier to arrange a network system of the devices. Since the devices are controlled centrally by the central controller, the display device can display information regarding the devices in a centralized manner by communicating with the central controller. Also, since the information regarding the watercraft is preferably displayed in a GUI format, the operator can easily understand a plurality of information displayed on the display device simultaneously. As a result, the operability of the devices can be improved. Since the display device preferably includes a touch panel function, the operability of the devices can be improved even further.

Preferably, the devices are centrally controlled by the central controller. Consequently, it is easier to arrange a network system of the devices. Also, the central controller and the display device are preferably integrated into a single central control unit. Consequently, it is even easier to arrange a network system of the devices. Additionally, since the devices are controlled centrally by the central controller, the display device can display information regarding the devices in a centralized manner by communicating with the central controller. Also, since the information regarding the watercraft is preferably displayed in a GUI format, the operator can easily grasp a plurality of information displayed on the display device simultaneously. As a result, the operability of the devices can be improved.

The first preferred embodiment of the present invention can also be applied to a second preferred embodiment of the present invention, as will now be explained.

A conventional watercraft is provided with various switches for operating devices installed on the watercraft. For example, FIG. 6 of Laid-open Japanese Patent Application No. 2011-073606 discloses a dashboard of a watercraft. The dashboard is arranged frontward of a helm seat and numerous switches including a blower switch are arranged on the dashboard.

In recent years, the number of devices installed on watercrafts has increased and thus the number of switches for operating the devices has increased. Not only switches, but levers and other operating members have also increased in number. As the number of operating members increases, providing space in which to arrange the operating members becomes a problem.

A second preferred embodiment of the present invention provides a watercraft in which a large number of devices can be operated while conserving space by minimizing the number of operating members. The second preferred embodiment of the present invention is explained below.

A watercraft according to the second preferred embodiment of the present invention includes a plurality of devices, a controller programmed to control the devices, and a display device that communicates with the controller, wherein the display device preferably includes a touch panel function and displays software keys to operate the devices.

Preferably, the devices include a first device that communicates with the controller using a first protocol and a second device that communicates with the controller using a second protocol different from the first protocol.

Preferably, the devices include a power source that generates power to propel the watercraft, and the software keys include a start switch for the power source.

Preferably, the devices include a power source that generates power to propel the watercraft, and the software keys include a stop switch for the power source.

Preferably, the devices include a first device and a second device, and the display device displays a first software key to operate the first device and a second software key to operate the second device.

Preferably, the display device displays the first software key and the second software key on the same screen.

Preferably, the display device displays a screen including the first software key and a screen including the second software key in a switchable fashion.

The first and second preferred embodiments can also be applied to a third preferred embodiment of the present invention, as will now be explained.

A conventional watercraft is equipped with a wireless communication device for communicating with other watercrafts. For example, Laid-open Japanese Patent Application No. 2010-147706 discloses a wireless communication device for a watercraft in which a DSB transmitter is used. The DSB transmitter is one type of AM transmitter that generates an AM signal including a carrier wave whose amplitude is varied according to a signal.

Although the wireless communication device is used to conduct wireless voice communications with another watercraft, it is not acceptable to use it for conversations between passengers onboard the same watercraft. On the deck of a watercraft, particularly a PWC (personal watercraft), wind noise and other noise makes it difficult for passengers to converse while the watercraft is traveling.

A third preferred embodiment of the present invention provides a watercraft that enables passengers onboard to converse comfortably while the watercraft is traveling. The third preferred embodiment of the present invention is explained below.

A watercraft according to the third preferred embodiment of the present invention includes a plurality of devices, and a controller programmed to control the devices, wherein the controller is programmed to communicate with a plurality of headsets each including a microphone and a speaker using a specific wireless communication standard, and to execute control such that audio data inputted to the microphone of one headset is outputted from the speaker of another headset.

Preferably, when the controller detects trouble in at least one of the devices, the controller outputs a warning sound from the speakers of the headsets notifying of the trouble.

Preferably, the plurality of devices includes a power source, and when the controller detects trouble of the power source, the controller outputs a warning sound from the speakers of the headsets notifying of the trouble.

Preferably, the controller includes a storage device and outputs music stored in the storage device from the speakers of the headsets.

Preferably, the controller is programmed to communicate with an external mobile terminal and output music stored in the mobile terminal from the speakers of the headsets.

Preferably, the controller is programmed to communicate with an external mobile terminal and output music of an application running on the mobile terminal from the speakers of the headsets.

Preferably, the watercraft further includes a switch to operate at least one of the devices, wherein the controller outputs an operation confirmation sound of the switch from the speakers of the headsets.

The first through third preferred embodiments of the present invention can also be applied to a fourth preferred embodiment of the present invention, as will now be explained.

A conventional watercraft is equipped with an operating device for controlling movements of the watercraft. For example, Japanese Laid-open Patent Application Publication No. 2011-140272 discloses a watercraft equipped with a joystick. The joystick includes a lever that can be operated by tilting it from a neutral position. A propulsion unit and a steering unit are controlled according to the manipulation of the lever. More specifically, the direction of a propulsion force is controlled according to an operating direction of the lever. Meanwhile, the size of the propulsion force is controlled according to a tilt amount of the lever. When launching and docking, an operator operates the joystick to pilot the watercraft.

During normal cruising of the watercraft, the operator pilots the watercraft using a steering wheel or a remote control lever. Thus, the joystick or other operating device used during launching and docking is not used during normal cruising. Consequently, it is preferable for the joystick or other operating device to be compact so as not to become a nuisance during normal cruising.

A fourth preferred embodiment of the present invention reduces the size of an operating device of a watercraft. The fourth preferred embodiment of the present invention is explained below.

A watercraft according to the fourth preferred embodiment of the present invention includes a power source, a controller programmed to control the power source, and a display device that communicates with the controller, wherein the display device preferably includes a touch panel function and displays software keys to control movements of the watercraft.

Preferably, the display device can display information regarding the watercraft.

Preferably, the software keys include a key to control a lateral movement of the watercraft.

Preferably, the software keys include a key to control an in-place rotation of the watercraft.

Preferably, the software keys include a plurality of keys corresponding to movement directions of the watercraft.

Preferably, the software keys include an operating icon indicating a watercraft, and the watercraft is controlled to move in a direction corresponding to a slide direction of the operating icon when the operating icon is slid.

Preferably, the software keys include a lever-shaped operating icon, and the watercraft is controlled to move in a direction corresponding to a slide direction of the operating icon when the operating icon is slid.

Preferably, the display device is detachably mounted to the watercraft, and the display device communicates wirelessly with the controller at least when it is detached from the watercraft.

A watercraft according to a modification of the fourth preferred embodiment of the present invention includes a power source and a controller programmed to control the power source, wherein the controller is programmed to communicate with an external mobile terminal preferably including a touch panel function, and to control movements of the watercraft based on touch panel operations performed on the mobile terminal.

A watercraft according to another modification of the fourth preferred embodiment of the present invention includes a power source, and a controller programmed to control the power source, wherein the controller is programmed to communicate with an external mobile terminal, wherein the mobile terminal is arranged to detect tilting of the mobile terminal, and the controller is programmed to control movements of the watercraft based on the tilt of the mobile terminal.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of the present invention will now be explained with reference to the drawings.

Figure 1:
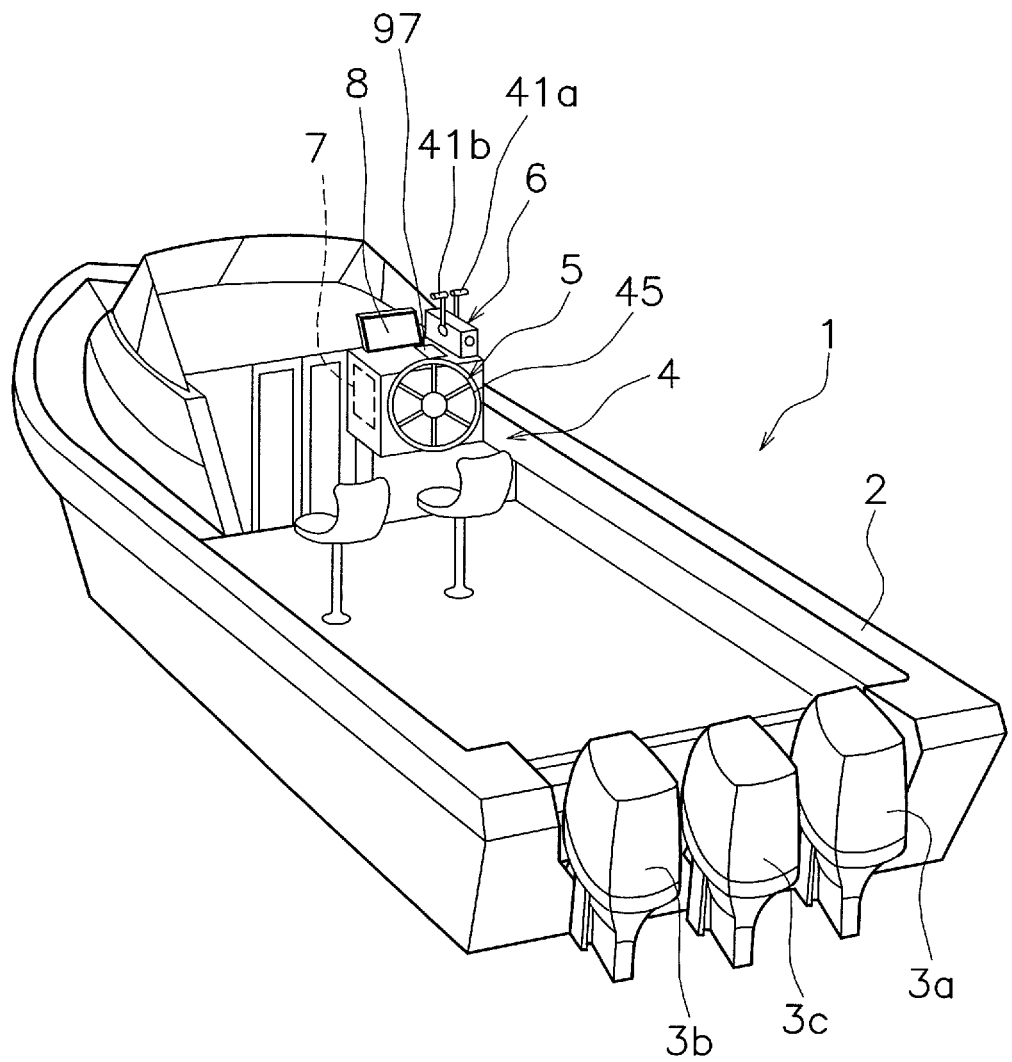
FIG. 1 is a perspective view of a watercraft according to a first preferred embodiment of the present invention.

FIG. 1 is a perspective view of a watercraft 1 according to a first preferred embodiment of the present invention. The watercraft 1 includes a watercraft body 2 and watercraft propulsion devices 3a to 3c, for example. In the present preferred embodiment, the watercraft 1 preferably includes three watercraft propulsion devices (hereinafter called "first watercraft propulsion device 3a," "second watercraft propulsion device 3b" and "third watercraft propulsion device 3c"). The first watercraft propulsion device 3a, the second watercraft propulsion device 3b, and the third watercraft propulsion device 3c are preferably outboard motors mounted to a stern of the watercraft body 2. The first watercraft propulsion device 3a, the second watercraft propulsion device 3b, and the third watercraft propulsion device 3c are arranged along the widthwise direction of the watercraft body 2. More specifically, the first watercraft propulsion device 3a is arranged on the starboard side of the stern, the second watercraft propulsion device 3b is arranged on the port side of the stern, and the third watercraft propulsion device 3c is arranged in the middle of the stern, i.e., between the first watercraft propulsion device 3a and the second watercraft propulsion device 3b. The first watercraft propulsion device 3a, the second watercraft propulsion device 3b, and the third watercraft propulsion device 3c each generate a propulsion force to propel the watercraft 1. The watercraft body 2 includes a helm seat 4. A steering device 5, a remote control device 6, a central controller 7, and a display device 8 are arranged at the helm seat 4. The steering device 5 is a device operated by an operator to control a turning direction of the watercraft 1. The remote control device 6 is a device operated by an operator to adjust the watercraft speed. The remote control device 6 is also used by the operator to switch between forward propulsion and reverse propulsion of the watercraft 1. The central controller 7 executes centralized control of the devices installed on the watercraft 1. The display device 8 is arranged frontward of the helm seat 4 or in another position that is easily viewed from the helm seat 4. The display device 8 communicates with the central controller 7 and displays information regarding the watercraft 1. The steering device 5, the remote control device 6, the central controller 7, and the display device 8 will be explained in detail below.

Figure 2:
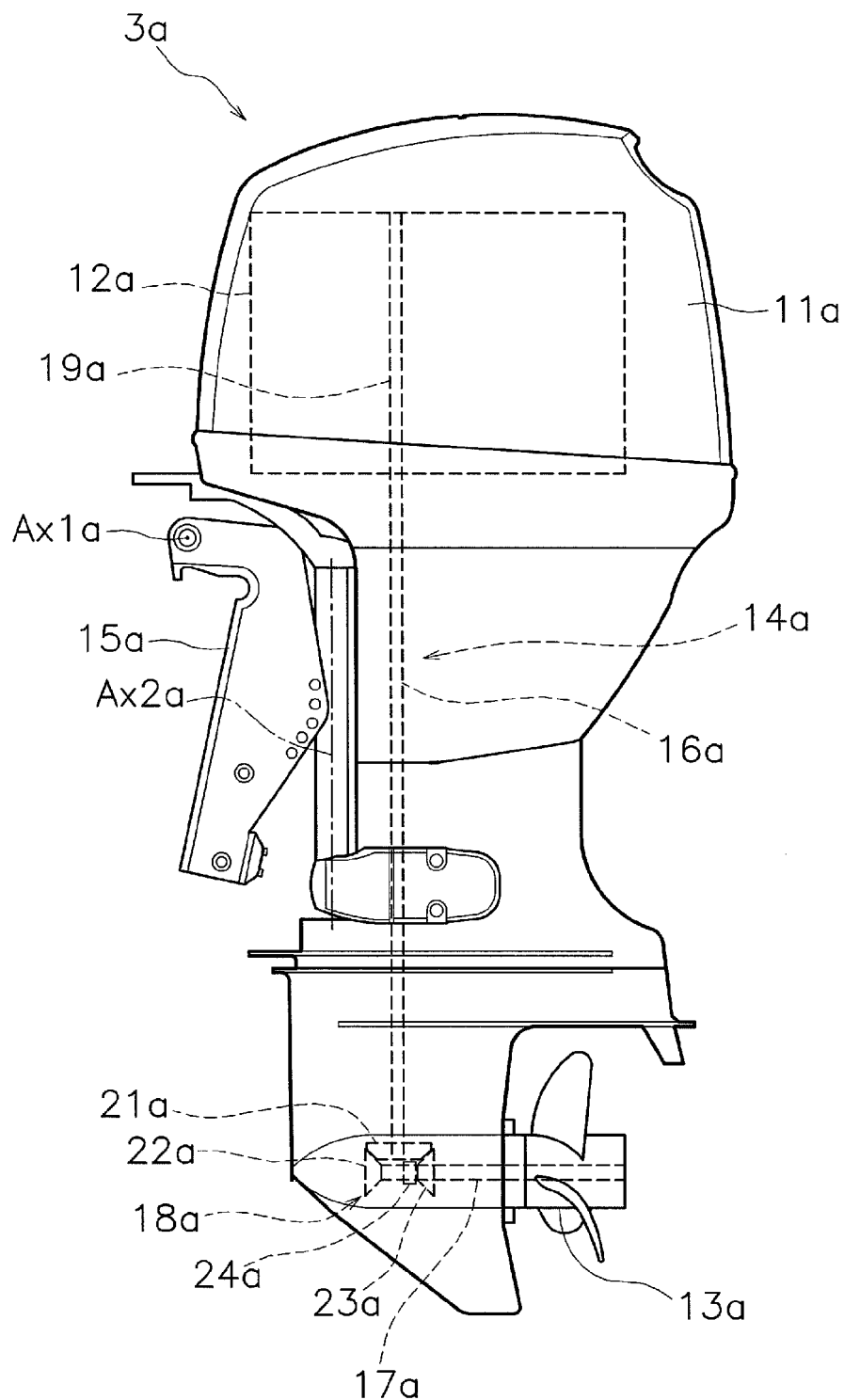
FIG. 2 is a side view of a watercraft propulsion device for a watercraft according to the first preferred embodiment of the present invention.

FIG. 2 is a side view showing the first watercraft propulsion device 3a. The structure of the first watercraft propulsion device 3a will now be explained. The structures of the second watercraft propulsion device 3b and the third watercraft propulsion device 3c are the same as the structure of the first watercraft propulsion device 3a. The first watercraft propulsion device 3a includes a cover member 11a, an engine 12a, a propeller 13a, a power transmitting mechanism 14a, and a bracket 15a. The cover member 11a houses an engine 12a and the power transmitting mechanism 14a. The engine 12a is arranged in an upper portion of the first watercraft propulsion device 3a. The engine 12a is an example of a power source that generates power for propelling the watercraft 1. The propeller 13a is arranged in a lower portion of the first watercraft propulsion device 3a. The propeller 13a is rotationally driven by a drive force from the engine 12a. The power transmitting mechanism 14a transmits a drive force from the engine 12a to the propeller 13a. The power transmitting mechanism 14a includes a drive shaft 16a, a propeller shaft 17a, and a shift mechanism 18a. The drive shaft 16a is arranged along a vertical direction.

The drive shaft 16a is coupled to a crankshaft 19a of the engine 12a and transmits power from the engine 12a. The propeller shaft 17a is arranged along a longitudinal direction. The propeller shaft 17a connects to a lower portion of the drive shaft 16a through the shift mechanism 18a. The propeller shaft 17a transmits a drive force from the drive shaft 16a to the propeller 13a.

The shift mechanism 18a is configured to change a rotation direction of power transmitted from the drive shaft 16a to the propeller shaft 17a. The shift mechanism 18a includes a pinion gear 21a, a forward propulsion gear 22a, a reverse propulsion gear 23a, and a dog clutch 24a. The pinion gear 21a is connected to the drive shaft 16a. The pinion gear 21a meshes with the forward propulsion gear 22a and the reverse propulsion gear 23a. The forward propulsion gear 22a and the reverse propulsion gear 23a are arranged such that they can undergo relative rotation with respect to the propeller shaft 17a. The dog clutch 24a is arranged such that it can move along an axial direction of the propeller shaft 17 to a forward propulsion position, a reverse propulsion position, and a neutral position. The neutral position is a position between the forward propulsion position and the reverse propulsion position. When the dog clutch 24a is positioned in the forward propulsion position, rotation of the drive shaft 16a is transmitted to the propeller shaft 17a through the forward propulsion gear 22a. As a result, the propeller 13a rotates in a direction of propelling the watercraft body 2 forward. When the dog clutch 24a is positioned in the reverse propulsion position, rotation of the drive shaft 16a is transmitted to the propeller shaft 17a through the reverse propulsion gear 23a. As a result, the propeller 13a rotates in a direction of propelling the watercraft body 2 in reverse. When the dog clutch 24a is positioned in the neutral position, the forward propulsion gear 22a and the reverse propulsion gear 23a rotate relative to the propeller shaft 17a. Thus, rotation from the drive shaft 16 is not transmitted to the propeller shaft 17a and the propeller shaft 17a can rotate idly.

The bracket 15a is a mechanism that mounts the first watercraft propulsion device 3a to the watercraft body 2. The first watercraft propulsion device 3a is fixed detachably to the stern of the watercraft body 2 through the bracket 15a. The first watercraft propulsion device 3a is mounted such that it can turn about a tilt axis Ax1a of the bracket 15a. The tilt axis Ax1a extends in a widthwise direction of the watercraft body 2. The first watercraft propulsion device 3a is mounted such that it can turn about a steering axis Ax2a of the bracket 15a. A steering angle can be changed by turning the first watercraft propulsion device 3a about the steering axis Ax2a. The steering angle is an angle that the direction of a propulsion force makes with a centerline extending along a longitudinal direction of the watercraft body 2. Also, by turning the first watercraft propulsion device 3a about the tilt axis Ax1a, a trim angle of the first watercraft propulsion device 3a can be changed. The trim angle is equivalent to amounting angle of the watercraft propulsion device with respect to the watercraft body 2.

Figure 3:
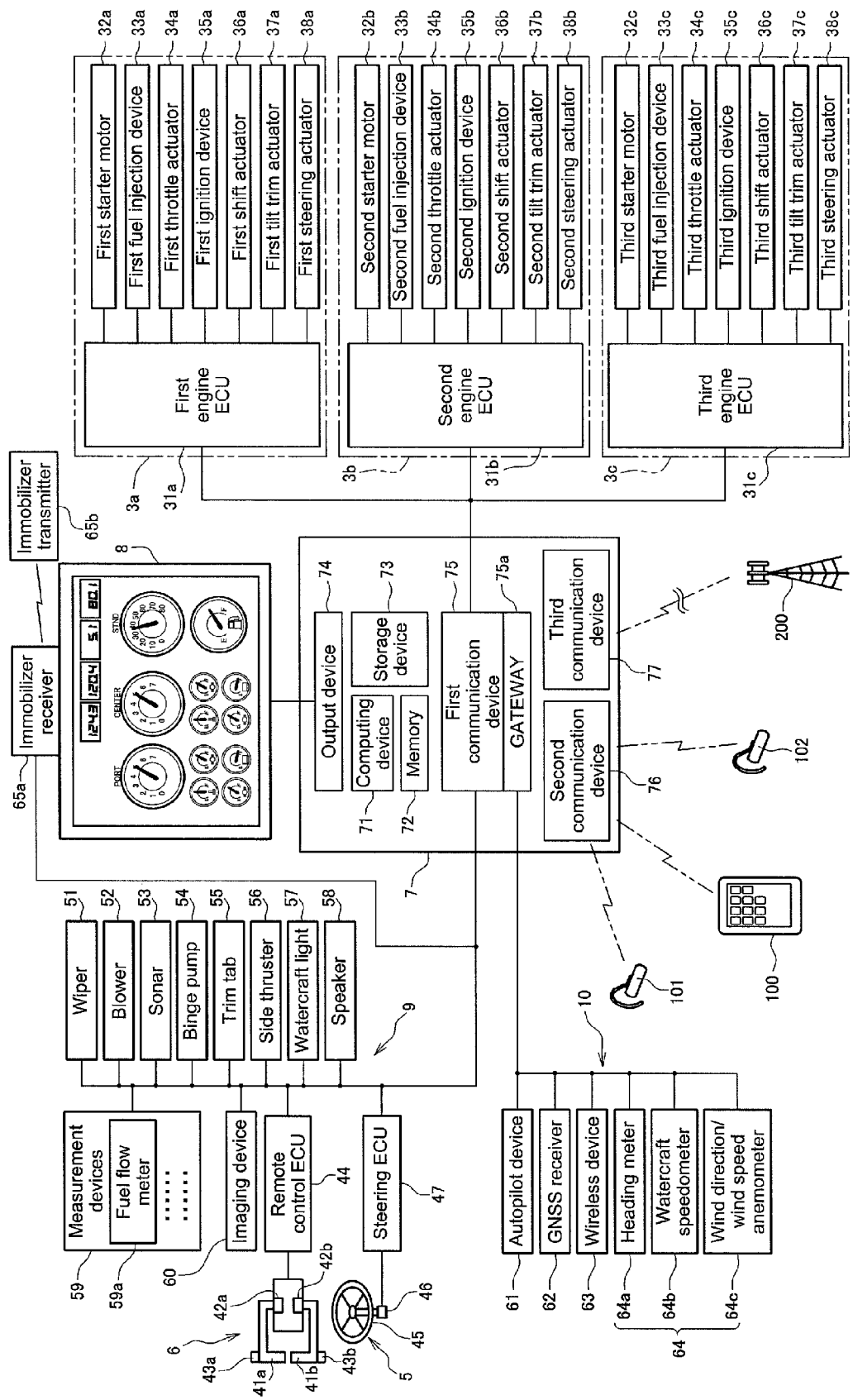
FIG. 3 is a simple diagram showing constituent features of a device network system of the watercraft.

FIG. 3 is a simple diagram showing constituent features of a device network system installed in the watercraft 1. The device network system includes the first watercraft propulsion device 3a, the second watercraft propulsion device 3b, the third watercraft propulsion device 3c, the steering device 5, the remote control device 6, the central controller 7, and the display device 8. The device network system of the watercraft 1 also includes a first additional function system 9 and a second additional function system 10.

The first watercraft propulsion device 3a includes a first engine ECU (electronic control unit) 31a, a first starter motor 32a, a first fuel injection device 33a, a first throttle actuator 34a, a first ignition device 35a, a first shift actuator 36a, a first tilt/trim actuator 37a, and a first steering actuator 38a.

The first starter motor 32a starts the engine 12a. The first fuel injection device 33a injects fuel into a combustion chamber of the engine 12a. The first throttle actuator 34a changes an opening degree of throttle valve of the engine 12a. An amount of air-fuel mixture delivered to the combustion chamber is adjusted by varying the opening degree of the throttle valve of the engine 12a. The ignition device 35a ignites fuel inside the combustion chamber. The first shift actuator 36a changes the position of the dog clutch 24a among the forward propulsion position, the reverse propulsion position, and the neutral position. The first tilt/trim actuator 37a turns the first watercraft propulsion device 3a about a tilt axis Ax1a of the bracket 15a. In this way, a tilt angle of the first watercraft propulsion device 3a is changed. The first steering actuator 38a turns the first watercraft propulsion device 3a about the steering axis Ax2a of the bracket 15a. In this way, the steering angle of the first watercraft propulsion device 3a is changed.

The first engine ECU 31a stores a control program for the engine 12a. The first engine ECU 31a controls operations of the first starter motor 32a, the first fuel injection device 33a, the first throttle actuator 34a, the first ignition device 35a, the first shift actuator 36a, the first tilt/trim actuator 37a, and the first steering actuator 38a based on a signal from the steering device 5, a signal from the remote control device 6, and detection signals from other sensors (not shown in the drawings) installed in the first watercraft propulsion device 3a. The first engine ECU 31a is connected to the central controller 7 through a communication line. For example, the first engine ECU 31a communicates with the central controller 7 using a CAN (controller area network) protocol.

The second watercraft propulsion device 3b includes a second engine ECU 31b, a second starter motor 32b, a second fuel injection device 33b, a second throttle actuator 34b, a second ignition device 35b, a second shift actuator 36b, a second tilt/trim actuator 37b, and a second steering actuator 38b. The third watercraft propulsion device 3c includes a third engine ECU 31c, a third starter motor 32c, a third fuel injection device 33c, a third throttle actuator 34c, a third ignition device 35b, a third shift actuator 36c, a third tilt/trim actuator 37c, and a third steering actuator 38c. Since the component devices of the second watercraft propulsion device 3b and the third watercraft propulsion device 3c have the same functions as the component devices of the first watercraft propulsion devices 3a, detailed descriptions of these devices will be omitted. Also, in FIG. 3 component devices of the first watercraft propulsion device 3a and the second watercraft propulsion device 3b that correspond to each other are indicated with the same reference numerals. Similarly, component devices of the first watercraft propulsion device 3a and the third watercraft propulsion device 3c that correspond to each other are indicated with the same reference numerals.

The remote control device 6 includes a first operating member 41a, a first operating position sensor 42a, a first PTT operating member 43a, a second operating member 41b, a second operating position sensor 42b, a second PTT operating member 43b, and a remote control ECU 44. The first operating member 41a is, for example, a lever. The first operating member 41a can be tilted forward and rearward. The first operating position sensor 42a detects an operating position of the first operating member 41a. When an operator operates the first operating member 41a, the first shift actuator 36a is driven such that the dog clutch 24a of the first watercraft propulsion device 3a is set to a shift position corresponding to the operating position of the first operating member 41a. In this way, an operator can change the rotation direction of the propeller 13a of the first watercraft propulsion device 3a between a forward direction and a reverse direction. Also, a target engine rotational speed of the first watercraft propulsion device 3a is set to a value corresponding to the operating position of the first operating member 41a. Thus, the operator can adjust a rotational speed of the propeller 13a of the first watercraft propulsion device 3a.

The first PTT operating member 43a is, for example, a switch. When an operator operates the first PTT operating member 43a, the first tilt/trim actuator 37a is driven. In this way, the operator can change a trim angle of the first watercraft propulsion device 3a.

The second operating member 41b is, for example, a lever. The second operating member 41b is arranged side-by-side (left and right) with the first operating member 41a. The second operating member 41b can be pivoted forward and rearward. The second operating position sensor 42b detects an operating position of the second operating member 41b. When an operator operates the second operating member 41b, the second shift actuator 36b is driven such that the dog clutch of the second watercraft propulsion device 3b is set to a shift position corresponding to the operating position of the second operating member 41b. In this way, an operator can change the rotation direction of a propeller of the second watercraft propulsion device 3b between a forward direction and a reverse direction. A target engine rotational speed of the second watercraft propulsion device 3b is set to a value corresponding to the operating position of the second operating member 41b. Thus, the operator can adjust a rotational speed of the propeller of the second watercraft propulsion device 3b. The second PTT operating member 43b is, for example, a switch. When an operator operates the second PTT operating member 43b, the second tilt/trim actuator 37b is driven. In this way, the operator can change a trim angle of the second watercraft propulsion device 3b.

Switching of the propulsion direction of the third watercraft propulsion device 3c between forward and reverse and setting a target engine rotational speed of the third watercraft propulsion device 3c are accomplished according to operations of the first operating member 41a and the second operating member 41b. More specifically, if the shift positions corresponding to the operating positions of both the first operating member 41a and the second operating member 41b are the same, then the dog clutch of the third watercraft propulsion device 3c is set to that same shift position. The target engine rotational speed of the third watercraft propulsion device 3c is set to an average value of the target engine rotational speed of the first watercraft propulsion device 3a and the target engine rotational speed of the second watercraft propulsion device 3b. If the shift positions corresponding to the operating positions of both the first operating member 41a and the second operating member 41b are not the same, then the dog clutch of the third watercraft propulsion device 3c is set to a neutral position. In such a case, the target engine rotational speed of the third watercraft propulsion device 3c is set to a prescribed idle rotational speed.

The remote control ECU 44 is connected to the central controller 7 through a communication line. For example, the remote control ECU 44 communicates with the central controller 7 using an analog signal. The remote control ECU 44 sends the detection signal of the first operating position sensor 42a and the detection signal of the second operating position sensor 42b to the central controller 7. The remote control ECU 44 also sends operation signals from the first PTT operating member 43a and the second PTT operating member 43b to the central controller 7.

The steering device 5 includes a steering operating member 45, a steering position sensor 46, and a steering ECU 47. The steering operating member 45 is, for example, a steering wheel. The steering position sensor 46 detects an operating amount, i.e., an operating angle, of the steering operating member 45. When an operator operates the steering operating member 45, the first steering actuator 38a, the second steering actuator 38b, and the third steering actuator 38c are driven. As a result, the operator can adjust an advancing direction of the watercraft 1. The steering ECU 47 is connected to the central controller 7 through a communication line. For example, the steering control ECU 47 communicates with the central controller 7 using an analog signal. The steering ECU 47 transmits the detection signal of the steering position sensor 46 to the central controller 7.

The additional function system 9 includes, for example, a wiper 51, a blower 52, a sonar 53, a bilge pump 54, a trim tab 55, a side thruster 56, a watercraft light 57, a speaker 58, and various measurement devices 59. The wiper 51 is attached to a front windshield frontward of the driver's seat. The blower 52 ventilates the interior of an engine room. Although a blower 52 is provided with respect to each of the first to third watercraft propulsion devices 3a to 3c, in FIG. 3, only one blower 52 is shown and the other blowers are omitted. The sonar 53 emits sound waves into the water surrounding the watercraft body 2 and measures the positions of objects in the water. The bilge pump 54 pumps water accumulated in a bottom of the watercraft to the exterior of the watercraft. The trim tab 55 significantly reduces and prevents shaking of the watercraft body 2 in the leftward and rightward directions caused by rotation of the propellers 13a. The trim tab 55 includes a fin (not shown in the drawings) and a drive device that changes the direction of the fin. Although a trim tab 55 is provided for each of the first to third watercraft propulsion devices 3a to 3c, in FIG. 3, only one trim tab 55 is shown and the other trim tabs are omitted. The side thruster 56 generates a propulsion force to move the watercraft body 2 in a lateral direction. The side thruster 56 includes, for example, a bow thruster provided on the bow and a stern thruster provided on the stern. The side thruster 56 includes a propeller (not shown) and a drive device that drives the propeller. The watercraft light 57 includes, for example, a mast light, a stern light, an anchor light, and a navigation light. The speaker 58 is arranged inside the watercraft and emits sound. These devices of the first additional function system 9 are connected to the central controller 7 through a communication line. Devices of the first additional function system 9 are, for example, provided by the manufacturer of the first to third watercraft propulsion devices 3a to 3c. The devices of the first additional function system 9 communicate with the central controller 7 using the same communication interface as is used for communication between the central controller 7 and the first to third engine ECUs. The devices of the first additional function system 9 communicate with the central controller 7 using, for example, CAN protocol. It is also acceptable for the devices of the first additional function system 9 to communicate with the central controller 7 using analog signals. Also, the first additional function system 9 includes an imaging device 60. The imaging device 60 is, for example, a camera. The imaging device 60 captures an image and generates electronic data expressing the image. The word "image" is used here to mean a photograph or other kind of still image. The imaging device 60 also captures a moving image and generates electronic data expressing the moving image. It is also acceptable for the first additional function system 9 to include other devices in addition to those already mentioned, e.g., a horn, interior lighting of the watercraft, or a live well pump for changing water in a live well provided on the watercraft.

The second additional function system 10 includes, for example, an autopilot device 61, a GNSS receiver 62, a wireless device 63 (two-way radio), and a variety of measurement devices 64. The autopilot device 61 is a device that holds a set course of the watercraft 1. If the course deviates from the set direction, the autopilot device 61 transmits a command signal to the central controller 7 to revise the course of the watercraft 1. The central controller 7 controls the first to third watercraft actuators 38a to 38c or the other devices based on the command signal from the autopilot device 61. In this way, the course of the watercraft 1 is automatically revised.

The GNSS receiver 62 is a receiver for a GPS or other GNSS (global navigation satellite system) and measures a current position of the watercraft 1. The wireless device 63 is, for example, an international VHF wireless (marine VHF radio) device that accomplishes voice communication using radio waves in a prescribed frequency band. The measurement devices 64 include a heading meter 64a, a watercraft speedometer 64b, and a wind speed/wind direction anemometer 64c. The devices of the second additional function system 10 are connected to the central controller 7 through a communication line. The devices of the second additional function system 10 are third party devices that are not made by the same manufacturer as the first to third watercraft propulsion devices 3a to 3c. Thus, the devices of the second additional function system 10 do not necessarily communicate with the central controller 7 using the same communication interface as is used for communication between the central controller 7 and the first to third engine ECUs 31a. Thus, a portion of the devices of the second additional function system 10 may communicate with the central controller 7 using a different communication interface than the communication interface used for communication between the central controller 7 and the first to third engine ECUs 31a to 31c. In such a case, the devices of the second additional function system. 10 communicate with the central controller 7 using a different protocol than the protocol used for communication between the central controller 7 and the first to third engine ECUs 31a to 31c. The devices of the second additional function system 10 communicate with the central controller 7 using, for example, a NMEA (National Marine Electronics Association) protocol. It is also acceptable for the devices of the second additional function system 10 to communicate with the central controller 7 using the CAN protocol in the same manner as the devices of the first additional function system 9.

The central controller 7 defines a portion of a device network system of the watercraft 1 that also includes a plurality of devices installed on the watercraft 1. The central controller 7 functions as a network host having a central role in the device network system. The central controller 7 includes a computing device 71 such as a CPU or other computing device, a memory 72, a storage device 73, an output device 74, a first communication device 75, a second communication device 76, and a third communication device 77. The storage device 73 is, for example, a hard disk or a flash memory. It is acceptable for the storage section 73 to be an SD card, a USB memory, or another external storage medium. The output device 74 sends an image signal to the display device 8. If the display device 8 includes a built-in speaker, then it is acceptable for the output device 74 to send an audio signal to the display device 8 along with the image signal.

The first communication device 75 conducts communications among the first watercraft propulsion device 3a, the second watercraft propulsion device 3b, the third watercraft propulsion device 3c, the steering device 5, the remote control device 6, the devices of the first additional function system 9, and the devices of the second additional function system 10. The first communication device 75 includes a plurality of ports not shown in the drawings. The plurality of ports are connected to communication lines from the first to third engine ECUs 31a to 31c, the steering ECU 47, the remote control ECU 44, the devices of the first additional function system 9, and the devices of the second additional function system 10. The first communication device 75 includes a gateway 75a. The devices of the second additional function system 10 are connected to the central controller 7 through the gateway 75a. The second communication device 76 conducts communication with devices that are external to the device network of the watercraft 1. The second communication device 76 communicates with the external devices using, for example, Bluetooth, a wireless LAN, or another specific wireless communication standard. The external devices are, for example, mobile terminals 100 such as smart phones and tablets. The third communication device 77 is for connecting to the internet. The third communication device 77 conducts communication with a mobile communication base station 200. For example, the third communication device 77 connects to the internet using 3G or 4G mobile communication.

Figure 4:
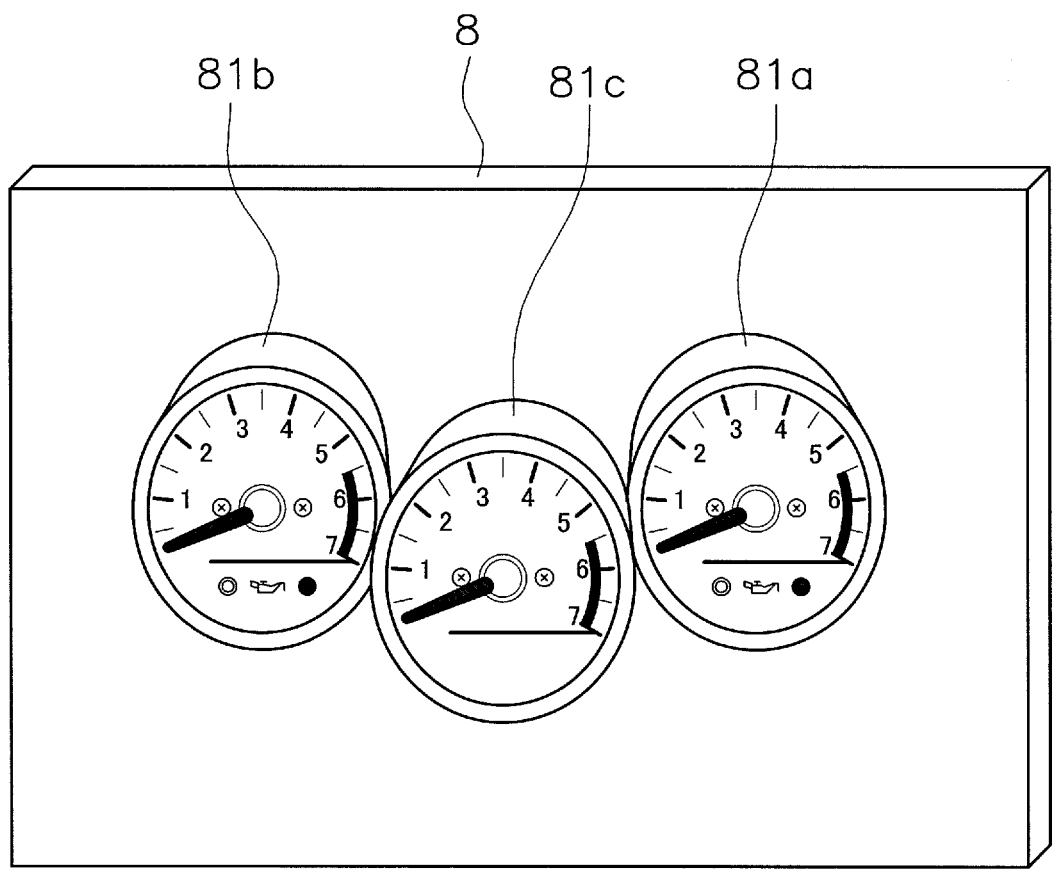
FIG. 4 is a screenshot exemplifying a screen shown on a display device.
Figure 5:
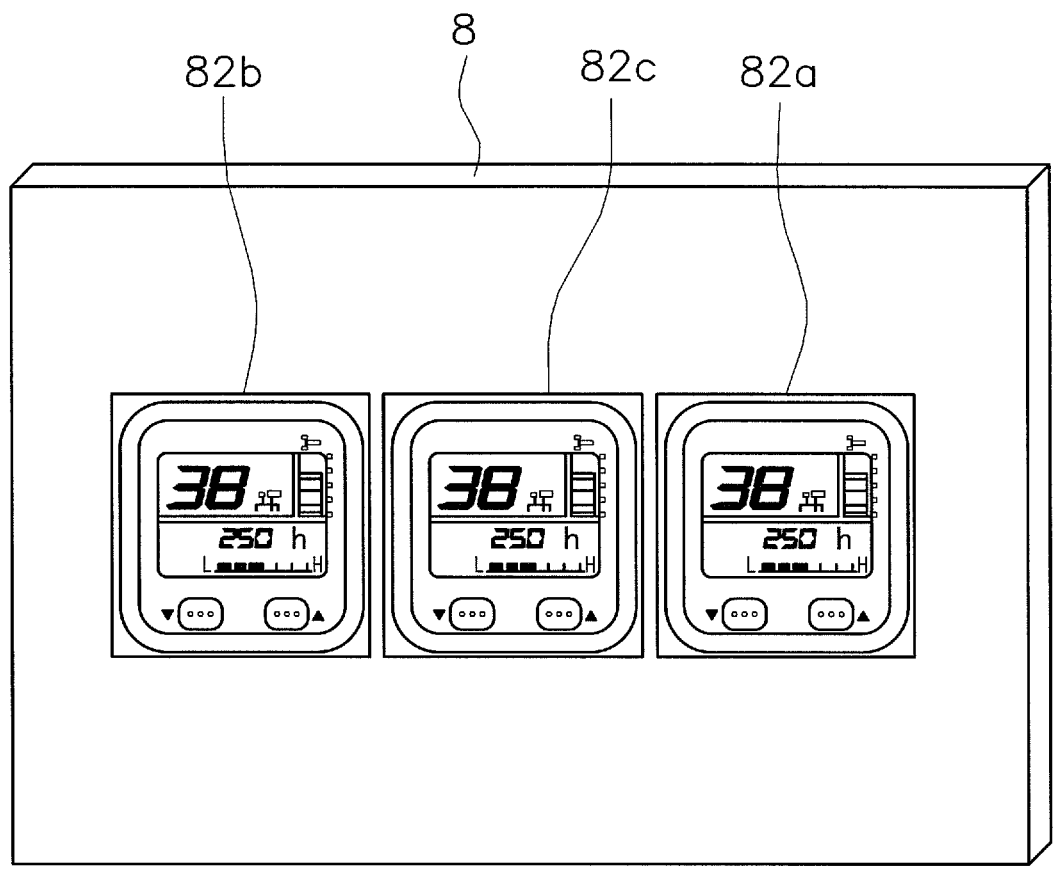
FIG. 5 is a screenshot exemplifying another screen shown on a display device.

The display device 8 displays information about the watercraft in a GUI (graphical user interface) format. The display device 8 displays information regarding the devices connected to the central controller 7. The display device 8 is, for example, a liquid crystal display, an organic EL (electroluminescent) display, or other type of display. The display device also preferably includes a touch panel function. An operator can change among the screens displayed on the display device 8 using a touch panel function. An operator can also operate the devices explained previously using the touch panel function. FIG. 4 and FIG. 5 show an example of a screen displayed on the display device 8. FIG. 4 shows the display device 8 displaying analog gauges 81a to 81c that indicate engine rotational speeds of the first to third watercraft propulsion devices 3a to 3c. FIG. 5 shows the display device 8 displaying digital gauges 82a to 82c that indicate engine rotational speeds of the first to third watercraft propulsion devices 3a to 3c. The functions provided in the central controller 7 and the display device 8 will now be explained in detail.

The display device 8 displays an image captured by the imaging device 60, or the display device 8 displays a moving image captured by the imaging device 60. The imaging device 60 captures a moving image of the scenery rearward of the watercraft 1, for example. The display device 8 displays the moving image captured by the imaging device 60 in real time. Thus, an operator can use the image displayed on the display device 8 to check the situation rearward of the watercraft during, for example, wakeboarding. The imaging device 60 also captures still images of the scenery rearward of the watercraft 1. The display device 8 displays images captured by the imaging device 60.

The still images and moving images captured by the imaging device 60 are stored in the storage device 73 as digital data. As a result, still images and moving images of people wakeboarding or doing other recreational activities behind the watercraft 1 can be stored. The central controller 7 can also transmit digital data stored in the storage device 73 to an external mobile terminal 100 through the second communication device 76. As a result, the still images and moving images stored in the storage device 73 can be uploaded readily to a social networking service (SNS), a blog, or a video sharing service.

It is also acceptable for the imaging device 60 to capture a moving image of the scenery in another direction other than the rearward direction of the watercraft 1 and for the display device 8 to display the moving image captured by the imaging device 60 in real time. In such a case, an operator can use the image displayed on the display device 8 to check the situation in a direction where visibility is poor from the helm seat 4. In this way, the visibility around the perimeter of the watercraft 1 can be improved. It is also acceptable for the imaging device 60 to capture a still image of the scenery in another direction other than the rearward direction of the watercraft 1.

Figure 6:
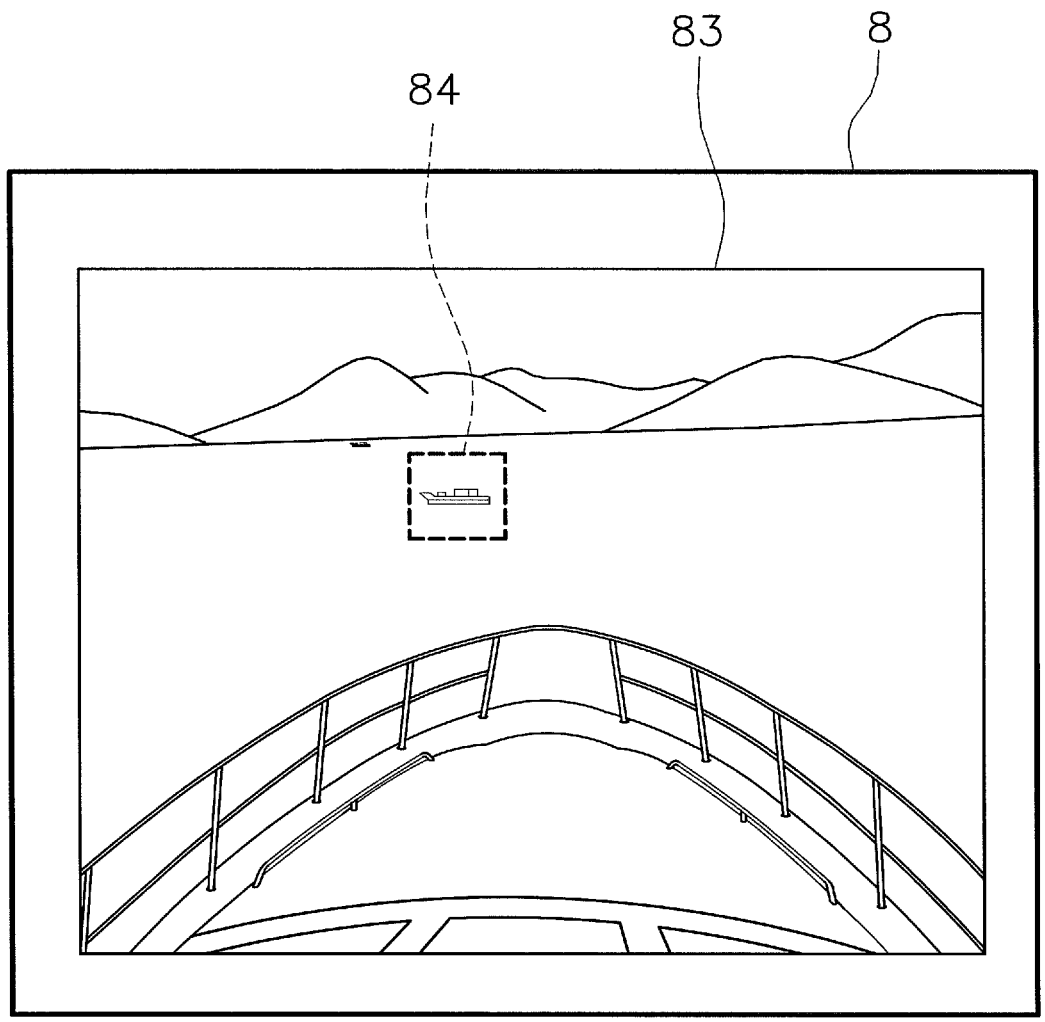
FIG. 6 is a screenshot showing an obstacle monitoring screen.

Additionally, the central controller 7 monitors the water surface for obstacles using the still images and moving images captured by the imaging device 60. The central controller 7 determines if an obstacle exists by executing image processing of the still images and moving images captured by the imaging device 60. The central controller 7 also notifies the operator if it determines that an obstacle exists. For example, as shown in FIG. 6, the central controller 7 attaches a mark 84 to the obstacle on the screen 83 displayed on the display device 8 to notify the operator. It is also acceptable to notify the operator by emitting a warning sound from the speaker 58.

Since the electronic data of the still images and moving images captured by the imaging device 60 are stored in the storage device 73, the imaging device 60 and the central controller can be used as a drive recorder. A drive recorder is a device that records a moving image or a still image captured at the moment when an accident occurs. When it detects information serving as a trigger while the watercraft is traveling, the central controller 7 stores a moving image or still image captured by the imaging device 60. Information serving as a trigger is information with which one can assume an accident has occurred, e.g., detection of an impact against the watercraft 1. Another example of information serving as a trigger is a sudden operation of the steering device 5 or the remote control device 6.

Figure 7:
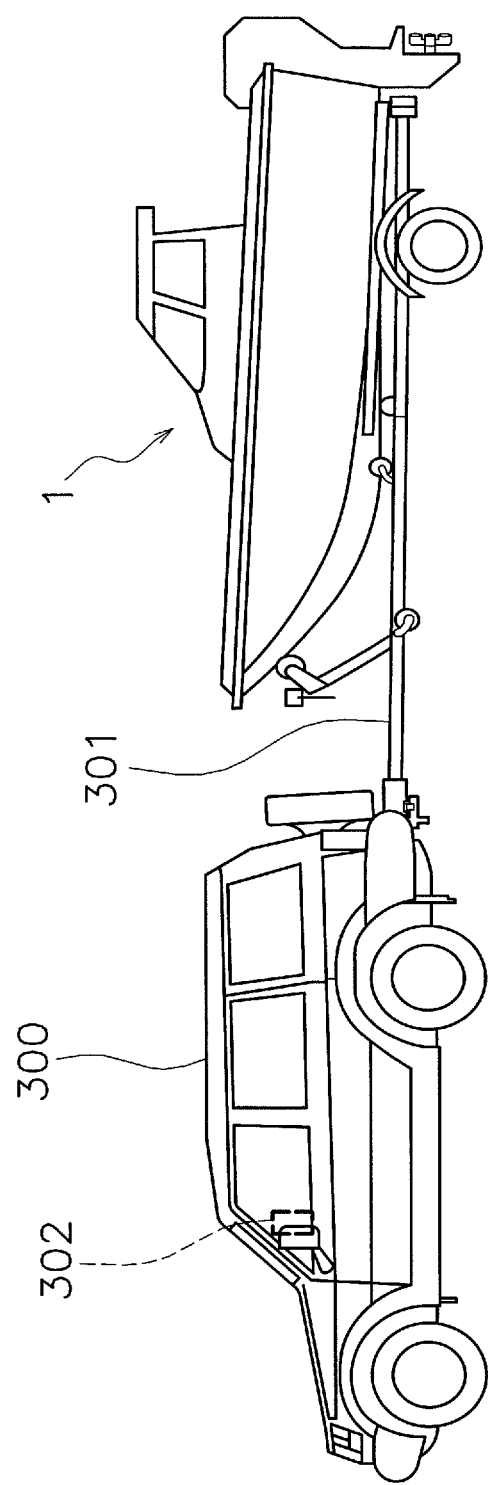
FIG. 7 is a side view showing a watercraft being transported on land.

As shown in FIG. 7, the watercraft 1 is sometimes carried to an ocean or a lake using an automobile 300 and a trailer 301 and put into the water using a ramp. In such a case, since an operator needs to visually check the surrounding perimeter of the watercraft 1 for safety, it is difficult for the operator to prepare for launching alone.

Figure 8:
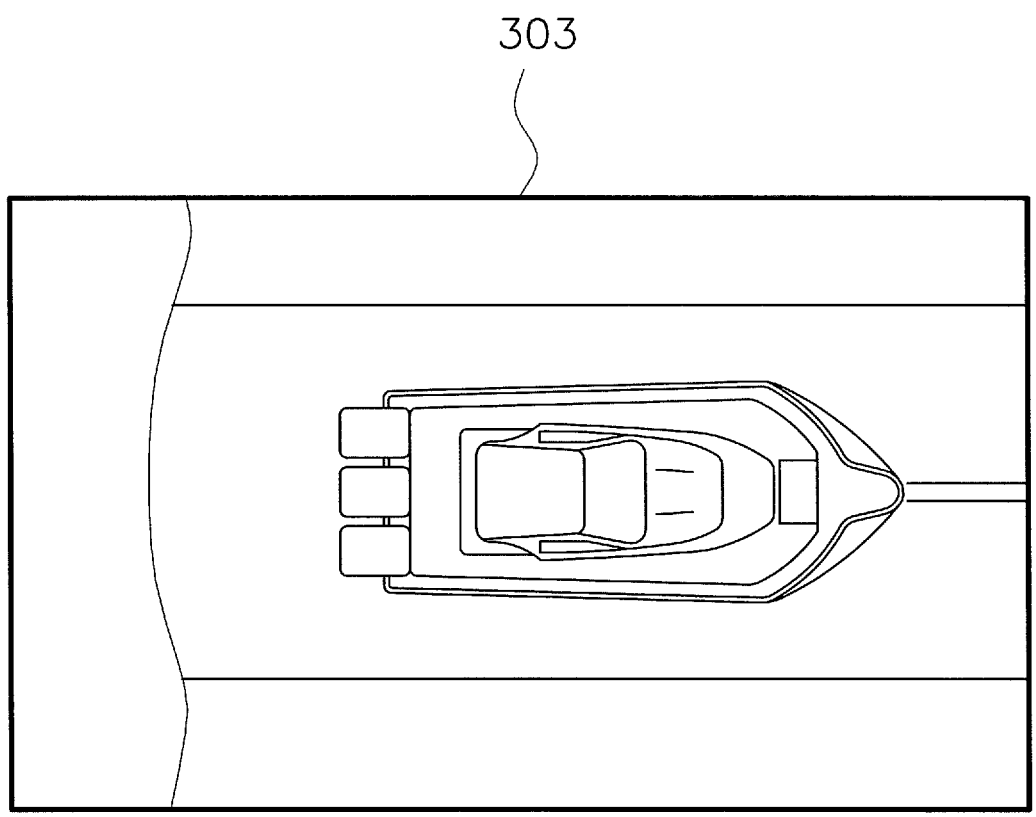
FIG. 8 is a bird's eye view showing the watercraft as displayed on a car navigation system of an automobile.

With the present preferred embodiment, the central controller 7 can communicate with a car navigation system installed in the automobile 300 using a wireless or wired communication device and transmit a still image or a moving image captured by the imaging device 60 to the car navigation system 302. FIG. 8 shows a screen 303 displayed on the car navigation system 302. As shown in FIG. 8, the central controller 7 processes an image of a region surrounding the watercraft 1 captured by the imaging device 60 and synthesizes a bird's eye view showing the watercraft 1 from above. The central controller 7 transmits electronic data for the bird's eye view image to the car navigation system 302. In this way, an operator can check the state of the watercraft 1 from the driver's seat of the automobile 300 while placing the watercraft 1 into the water. Instead of a bird's eye image, it is also acceptable for the central controller 7 to transmit an image showing a perimeter of the watercraft 1 from another perspective—particularly an image showing a region rearward of the watercraft 1—to the car navigation system 302 of the automobile 300.

Figure 9:
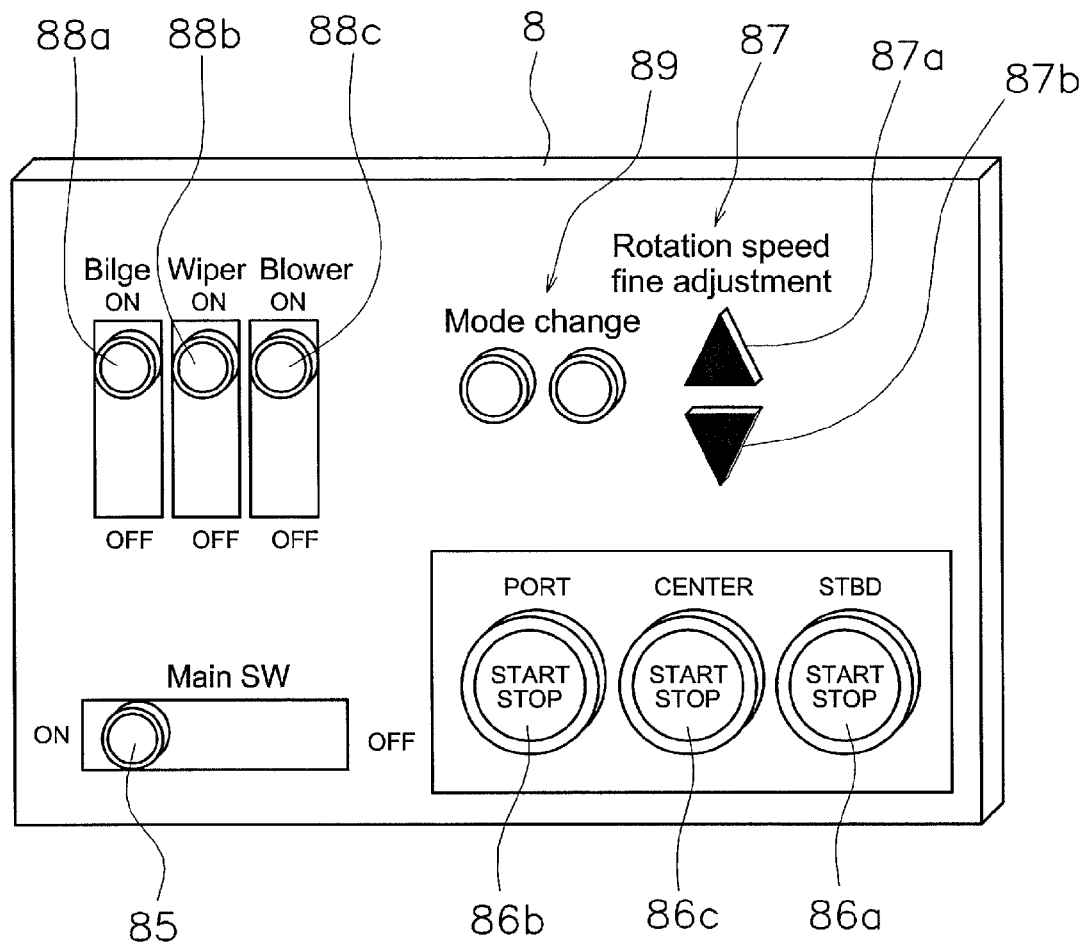
FIG. 9 is a screenshot of software keys displayed on the display device.

The devices can be operated by performing touch operations using the touch panel function of the display device 8. More specifically, as shown in FIG. 9, the display device 8 displays software keys. For example, an operator taps or drags the software keys to operate the devices.

The software keys include a main switch 85, a first start/stop switch 86*a*, a second start/stop switch 86*b*, and a third start/stop switch 86*c*. The main switch 85 is a switch for turning on and off a power source that powers the entire device network system of the watercraft 1. The first start/stop switch 86*a* is a switch to start and stop the engine 12*a* of the first watercraft propulsion device 3*a*. The second start/stop switch 86*b* is a switch to start and stop the engine of the second watercraft propulsion device 3*b*. The third start/stop switch 86*c* is a switch to start and stop the engine of the third watercraft propulsion device 3*c*.

The software keys include a speed fine adjusting switch 87. An operator can operate the speed fine adjusting switch 87 to finely adjust the engine rotational speed. The speed fine adjusting switch 87 includes an UP switch 87*a* and a DOWN switch 87*b*. When the UP switch 87*a* is tapped once, the engine rotational speed increases by a prescribed rotational speed. When the DOWN switch 87*b* is tapped once, the engine rotational speed decreases by a prescribed rotational speed.

The software keys include operating switches that operate the devices of the first additional function system 9 and operating switches that operate the devices of the second additional function system 10. For example, the software keys include a bilge switch 88*a*, a wiper switch 88*b*, and a blower switch 88*c*. The operator can switch the bilge pump 54, the wiper 51, the blower 52, and other devices on and off by operating these switches. Thus, as shown in FIG. 9, software keys that operate a plurality of different devices are displayed on the same screen.

These software keys include a mode changing switch 89. The mode changing switch 89 is a switch that changes a display mode. By operating the mode changing switch 89, the operator can change the screen displayed on the display device 8. For example, the mode changing switch 89 can be used to change to another operating screen that includes software keys that operate other devices.

It is also acceptable for control mode switches that switch control modes executed by the first to third engine ECUs 31*a* to 31*c* to be displayed. Examples of control mode switches include a no-wake mode switch and a cruise control switch. A no-wake mode is a control contrived to execute a low-speed travelling state while maintaining a predetermined engine rotational speed. When the no-wake mode switch is turned on, the central controller 7 sends a command signal to the first to third engine ECUs 31*a* to 31*c* requesting the no-wake mode to be executed. A cruise control is a control contrived to hold the engine at a rotational speed that existed when the cruise control switch was operated. When the cruise control switch is turned on, the central controller 7 sends a command signal to the first to third engine ECUs 31*a* to 31*c* requesting the cruise control to be executed.

As explained previously, the switches that operate the devices are displayed as software keys on the display device 8. Thus, the number of parts of the watercraft 1 can be reduced because mechanical switches can be omitted. As a result, the manufacturing cost can be reduced and space can be conserved. Also, since the number and design of the software keys can be changed by changing the program, watercrafts 1 having different specifications can be accommodated easily using the same hardware. Furthermore, unlike mechanical switches, the software keys do not degrade when exposed to rain and water droplets resulting from splashing during operation of the watercraft. As a result, the reliability of the operated devices is improved. The central controller can communicate with a plurality of devices having different protocols. Consequently, when, for example, the watercraft is equipped with a third party device that uses a different protocol from the protocol used by the standard devices provided, the software keys displayed on the display device 7 enable these devices to be operated without increasing the number of mechanical switches.

Figure 10:
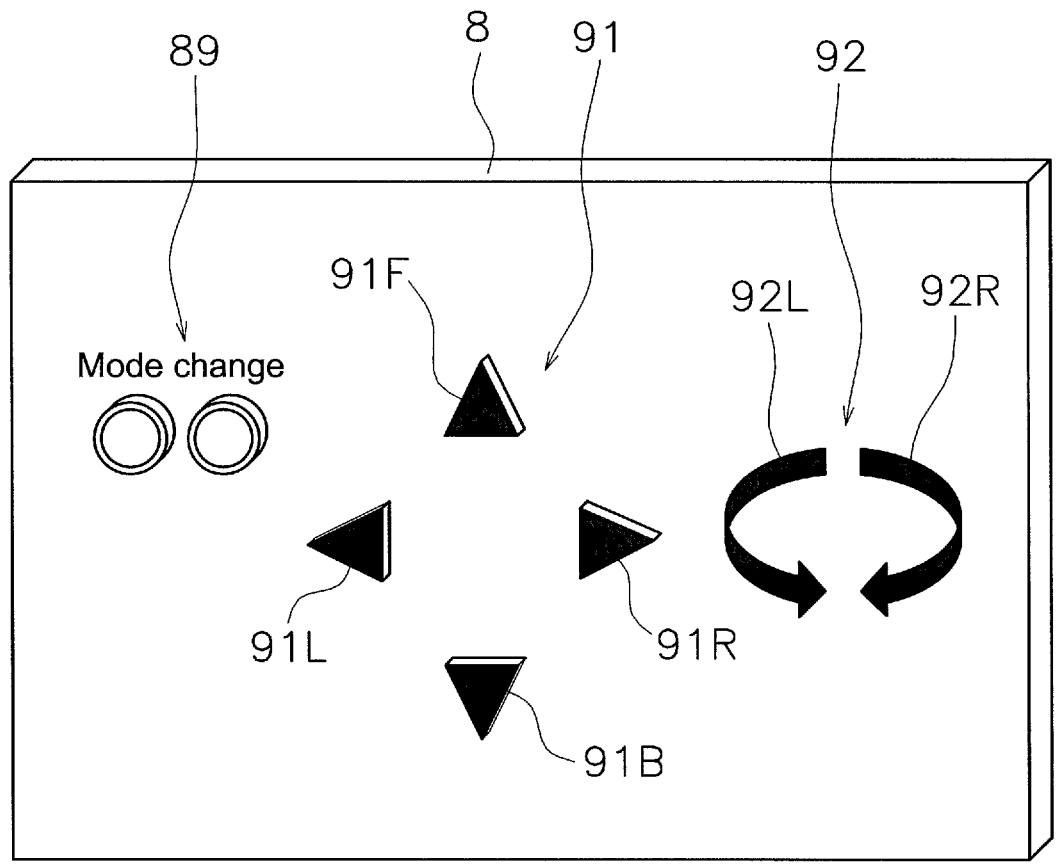
FIG. 10 is a screen shot showing an example of software keys for piloting the watercraft.

The watercraft 1 can be piloted using the touch panel function of the display device 8. More specifically, as shown in FIG. 10, the display device 8 displays software keys. The software keys include direction keys 91. The direction keys 91 are keys that move the watercraft 1 laterally and longitudinally and include a plurality of keys corresponding to different movement directions of the watercraft 1. The "lateral movement' of the watercraft 1 means translational movement of the watercraft 1 in a leftward or a rightward direction and is used when, for example, when berthing. In FIG. 10, the direction keys 91 are direction buttons. More specifically, the direction buttons include a left button 91L and aright button 91R. When the operator operates the left button 91L or the right button 91R, the central controller 7 controls side thruster 56 and the first to third watercraft propulsion devices 3a to 3c such that the watercraft 1 moves in the specified direction. The software keys also include a forward button 91F and a reverse button 91B. When the operator operates the forward button 91F or the reverse button 91B, the central controller 7 controls the side thruster 56 and the first to third watercraft propulsion devices 3a to 3c such that the watercraft 1 moves in the specified direction.

The software keys also include rotation keys 92. The rotation keys 92 are keys that rotate (pivoting) the watercraft 1 while remaining in place. In FIG. 10, the rotation keys 92 are rotation buttons. The rotation buttons include a right rotation button 92R and a left rotation button 92L. The right rotation button 92R is a button used to rotate the watercraft 1 rightward while remaining in place. The left rotation button 92L is a button used to rotate the watercraft 1 leftward while remaining in place. When the operator operates one of the rotation buttons, the central controller 7 controls the side thruster 56 and the first to third watercraft propulsion devices 3a to 3c such that the watercraft 1 rotates in the specified direction.

Figure 11:
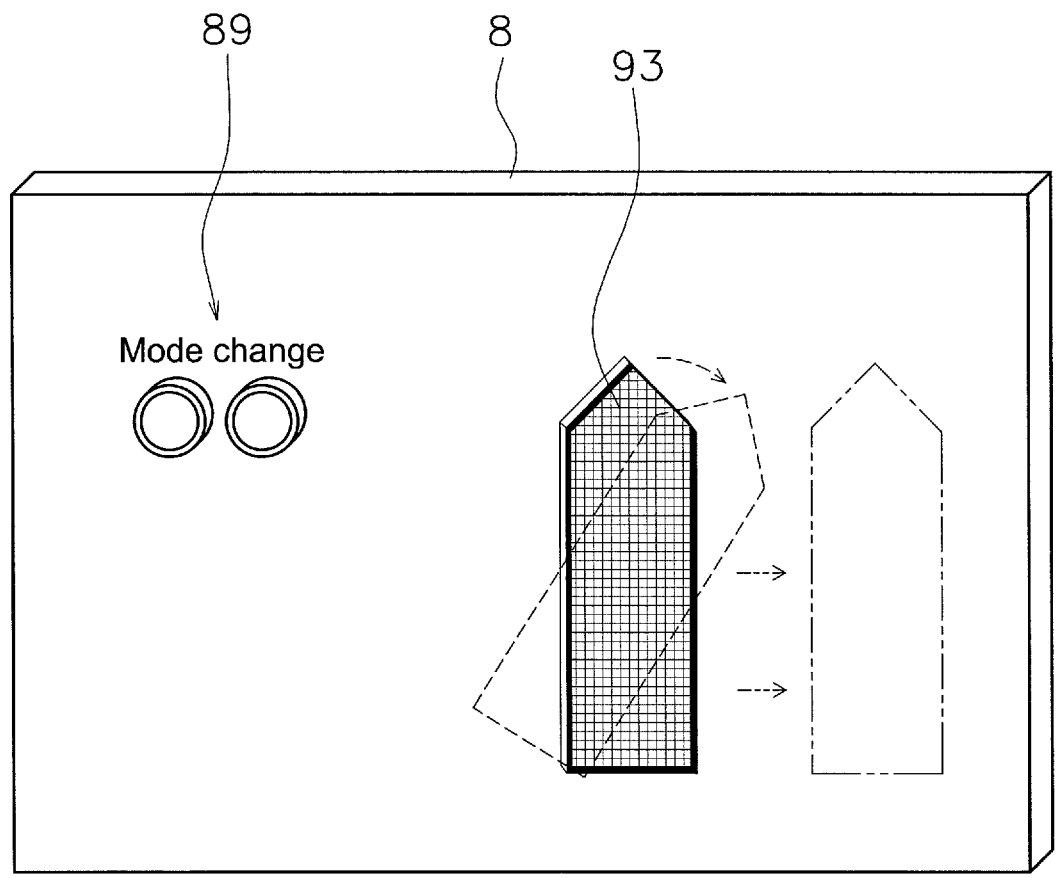
FIG. 11 is a screen shot showing another example of software keys for piloting the watercraft.

Instead of direction buttons 91L, 91R, 91F, 91B and rotation buttons 92L and 92R, it is acceptable to display an operating icon 93 that indicates the watercraft 1 as shown in FIG. 11. The operator can drag the operating icon 93 and slide it left and right. In response, the central controller 7 controls the side thruster 56 and the first to third watercraft propulsion devices 3a to 3c such that the watercraft 1 moves in a direction corresponding to the sliding direction of the operating icon 93. Also, the operator can drag the operating icon 93 such that it rotates rightward or leftward while remaining in place. In response, the central controller 7 controls the side thruster 56 and the first to third watercraft propulsion devices 3a to 3c such that the watercraft 1 rotates in a direction corresponding to the rotation direction of the operating icon 93 while remaining in place.

Figure 12:
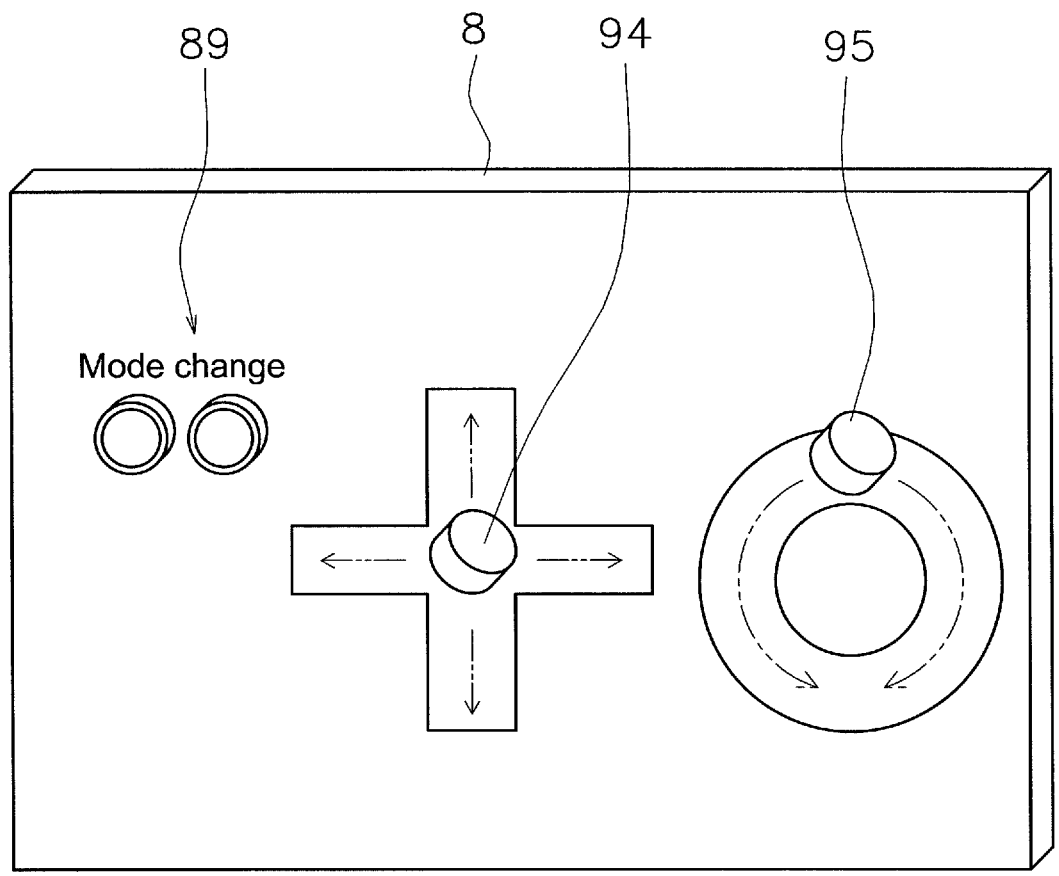
FIG. 12 is a screen shot showing still another example of software keys for piloting the watercraft.

Instead of the direction buttons 91L, 91R, 91F, and 91B, it is acceptable to display a direction lever 94 as shown in FIG. 12. Instead of the rotation buttons 92L and 92R, it is also acceptable to display a rotation lever 95. The direction lever 94 and the rotation lever 95 are both lever shaped operating icons. The operator can drag the direction lever 94 and move it in any of the forward, reverse, left, and right directions. When the operator operates the direction lever 94, the central controller 7 controls the side thruster 56 and the first to third watercraft propulsion devices 3a to 3c such that the watercraft 1 moves in the specified direction. Also, the operator can drag the rotation lever 95 such that it moves rightward or leftward in a circular fashion. When the operator operates the direction lever 95, the central controller 7 controls the side thruster 56 and the first to third watercraft propulsion devices 3a to 3c such that the watercraft 1 rotates in the specified direction.

With a conventional watercraft, a joystick or other separate operating device needs to be installed in the watercraft 1 in order to execute translational movement of the watercraft 1 or rotation while remaining in place. With the watercraft 1 according to the present preferred embodiment, the watercraft 1 can be moved translationally and rotated in place using the software keys displayed on the display device 8. Consequently, it is not necessary to provide a separate operating device and the manufacturing cost can be reduced. Also, since the number and design of the software keys can be changed by changing the program, watercrafts 1 having different specifications can be accommodated easily using the same hardware. Furthermore, unlike mechanical switches, the software keys do not degrade when exposed to rain and water droplets resulting from splashing during operation of the watercraft. As a result, the reliability of the operated devices is improved.

As explained previously, the central controller 7 can communicate with an external mobile terminal 100 through the second communication device 76. The central controller 7 communicates with the mobile terminal 100 and thereby acquires screen data displayed on a display of the mobile terminal 100. The central controller 7 then displays the same screen as is displayed on the display of the mobile terminal 100 on the display device 8 based on the acquired screen data. Thus, the display device 8 can display a screen of an application opened on the mobile terminal 100. The central controller 7 can also transmit a command signal generated by a touch operation of the display device 8 to the mobile terminal 100. The mobile terminal 100 executes control of the application based on the command signal from the central controller 7. In this way, an operator can operate the application of the mobile terminal 100 by executing touch operations on the display device 8.

Figure 13:
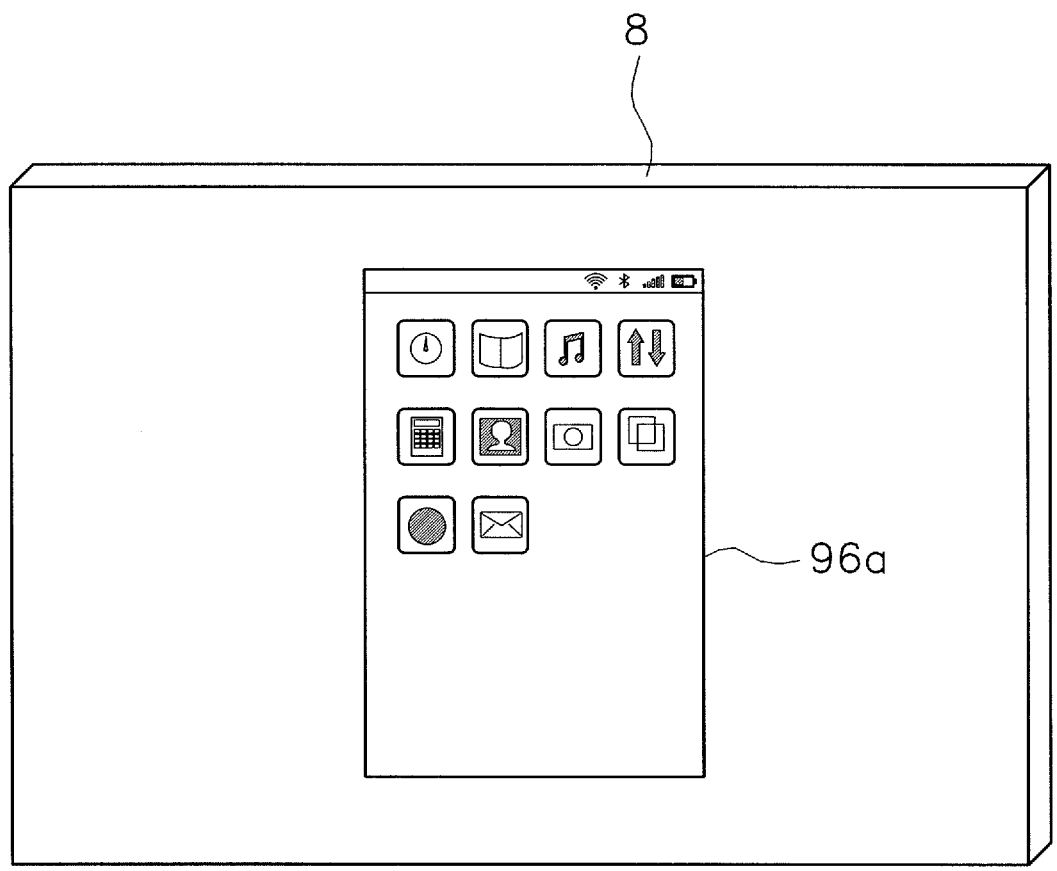
FIG. 13 is a screenshot showing an example of a mobile terminal screen displayed on the display device.
Figure 14:
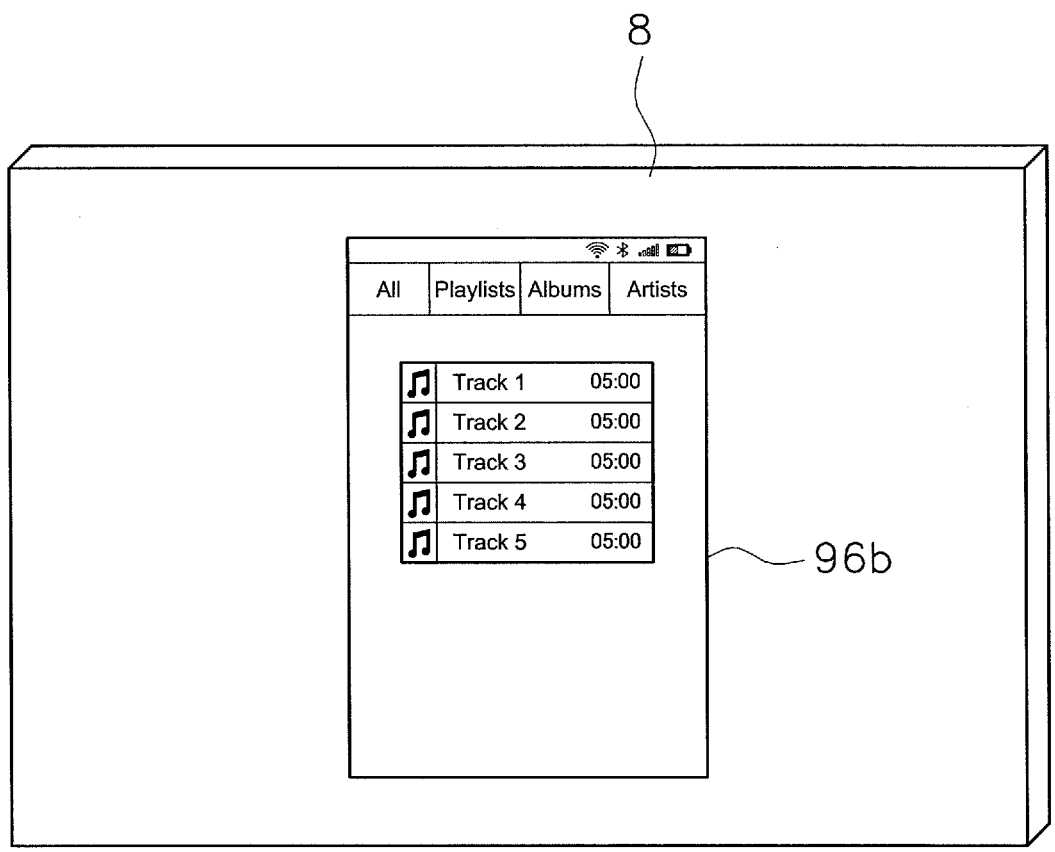
FIG. 14 is a screenshot showing another example of a mobile terminal screen displayed on the display device.

FIG. 13 shows an example of a screen displayed on the display device 8. As shown in FIG. 13, the display device 8 shows an application list screen 96a that is the same as the screen displayed on the display of the mobile terminal 100. An operator can open a desired application by tapping the icon of the application displayed on the display device 8. For example, FIG. 14 shows an operating screen 96b that is displayed when a music player application is opened. The same as the display of the mobile terminal 100, the display device 8 shows a playlist screen. An operator can select a desired music track by tapping the song name in the list displayed on the display device 8. When an operator selects a song by touching the display device 8, the central controller 7 transmits a command signal to the mobile terminal 100. As a result, the mobile terminal 100 plays back the selected song. It is also acceptable for the mobile terminal 100 to transmit music data for the selected song to the central controller 7 such that the music is played through the speaker 58 of the watercraft 1. The display device 8 is not limited to playing back music and can also display images and videos stored in the mobile terminal 100.

With the watercraft 1 according to the present preferred embodiment, since the central controller 7 can communicate with the external mobile terminal 100 as explained previously, the external mobile terminal 100 can be readily incorporated into the network of the watercraft 100. As a result, the functions of the mobile terminal 100 can be used readily aboard the watercraft 1. Although it is not easy to operate a mobile terminal 100 on a watercraft 1 that rocks severely and easily becomes wet, the mobile terminal 100 can be operated easily using the display device 8.

The communication between the central controller 7 and the external mobile terminal 100 is not limited to wireless communication and it is acceptable to communicate through a wired connection. For example, it is acceptable for the central controller 7 and the mobile terminal 100 to be connected through a USB or other wired communication interface.

The central controller 7 can also communicate with external hands free phones 101 and 102 (see FIG. 3) through the second communication device 76. The hands free phones 101 and 102 are headsets and each includes a microphone and an earphone. It is acceptable for the central controller 7 to communicate with three or more hands free phones. The central controller 7 relays audio data between the hands free phones 101 and 102. That is, the central controller 7 can take audio information inputted to a microphone of one hands free phone and output it from a speaker of another hands free phone. Thus, using the hands free phones, passengers inside the watercraft and on deck can converse comfortably with each other while the watercraft is moving even in the presence of wind and engine noise. In contrast to using a conventional transceiver, the present preferred embodiment enables a common hands free phone compatible with a specific wireless communication standard to be used and, thus, enables the system to be constructed inexpensively. It is also acceptable to use a mobile telephone or other device compatible with the specific wireless communication standard.

It is also acceptable for the central controller 7 to issue a warning sound notifying of trouble from the speakers of the hands free phones 101 and 102 when it detects trouble from at least one of the aforementioned plurality of devices. For example, the central controller 7 might issue a warning sound notifying of trouble from the speakers of the hands free phones 101 and 102 when it detects trouble in the engine 12a. It is acceptable for the central controller 7 to play music stored in the storing device 73 through the speakers of the hands free phones 101 and 102. It is also acceptable for the central controller 7 to play music stored in a mobile terminal 100 through the speakers of the hands free phones 101 and 102. It is also acceptable to play audio from an application running on the mobile terminal 100 through the speakers of the hands free phones 101 and 102. It is also acceptable for the central controller 7 to play an operation confirmation sound through the speakers of the hands free phones 101 and 102 to confirm a switch operation of at least one of the previously explained devices. It is acceptable for the switch to be a software key displayed on the display device 8. It is also acceptable for the switch to be a mechanical switch.

Figure 15:
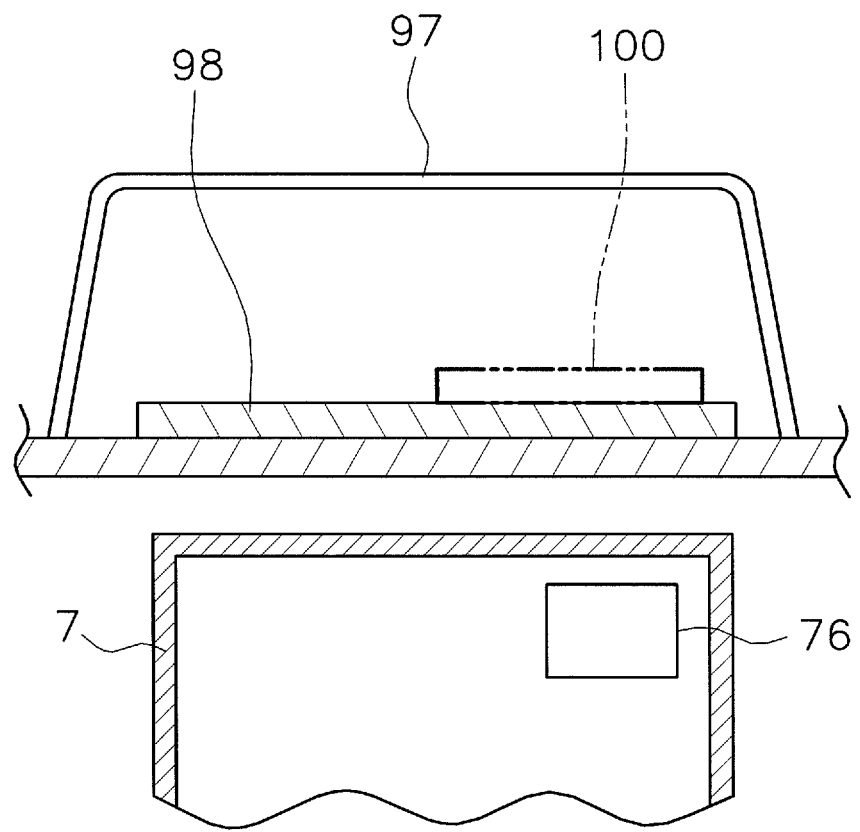
FIG. 15 is a cross sectional view of a water protective case.

As shown in FIG. 15, the watercraft 1 is preferably provided with a water protective case 97. The mobile terminal 100 is stored inside the water protective case 97. As shown in FIG. 1, the water protective case 97 is arranged in a location peripheral to the helm seat 4. The water protective case 97 is preferably arranged where it can be reached from the driver's seat. It is also acceptable to arrange the water protective case where it can be reached from a passenger's seat. The second communication device 76 is arranged in a position where it can communicate in a stable fashion with the mobile terminal 100 stored in the water protective case 97. The second communication device 76 is arranged, for example, below the water protective case 97 as shown in FIG. 15. A charging device 98 is preferably arranged between the mobile terminal 100 and the second communication device 76. The charging device 98 preferably includes a wireless charging function. That is, the charging device 98 is a non-contact type charger that can charge the mobile terminal 100 when the mobile terminal 100 is merely placed on the charging device 98. The water protective case 97 is preferably made of a transparent material. As a result, the mobile terminal 100 inside the water protective case 97 can be checked from the outside. It is acceptable for the water protective case 97 to be arranged using an existing storage compartment arranged on the watercraft 1. It is also acceptable for the water protective case 97 to be detachable. Furthermore, it is acceptable for the second communication device 76 to be a wired communication device including a connecting portion that extends into the interior of the water protective case 97 and connects to the mobile terminal 100. It is also acceptable for the charging device 98 to be a wired charging device including a connecting portion that extends into the interior of the water protective case 97 and connects to the mobile terminal 100.

Figure 16:
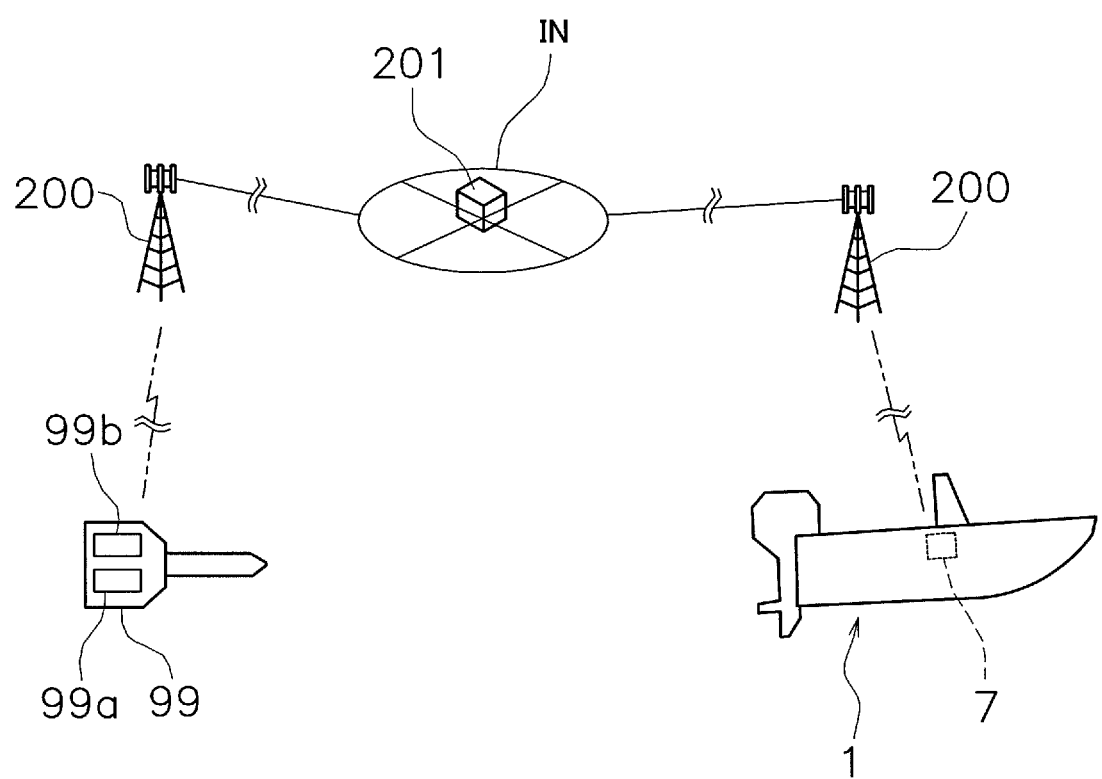
FIG. 16 is a simple sketch illustrating constituent features of a theft prevention function.

As shown in FIG. 16, a key 99 held by the user of the watercraft 1 includes a GNSS receiver 99a and a communication device 99b to communicate with an external communication network. The GNSS receiver 99a detects a current position of the key 99 and the communication device 99b transmits the current position information through the external communication network, e.g., the internet IN, to the central controller 7 of the watercraft 1. More specifically, the communication device 99b communicates with the base station 200 and transmits the current position information of the key 99 to a management server 201 contained in the internet IN. The central controller 7 receives the current position information of the key 99 from the management server 201 through the base station 200. The central controller 7 calculates a distance between the watercraft 1 and the key 99 based on current position information detected by the GNSS receiver 62 (see FIG. 3) of the watercraft 1 and the current position information detected by the GNSS receiver 99a of the key 99. The central controller 7 limits at least a portion of the functions of the watercraft 1 when the watercraft 1 and the key are separated by a distance larger than a prescribed threshold value. For example, the central controller 7 might prohibit starting the engines of the first to third watercraft propulsion devices 3a to 3c. Or, the central controller 7 might restrict the engines of the first to third watercraft propulsion devices 3a to 3c to a lower than normal output.

Figure 17:
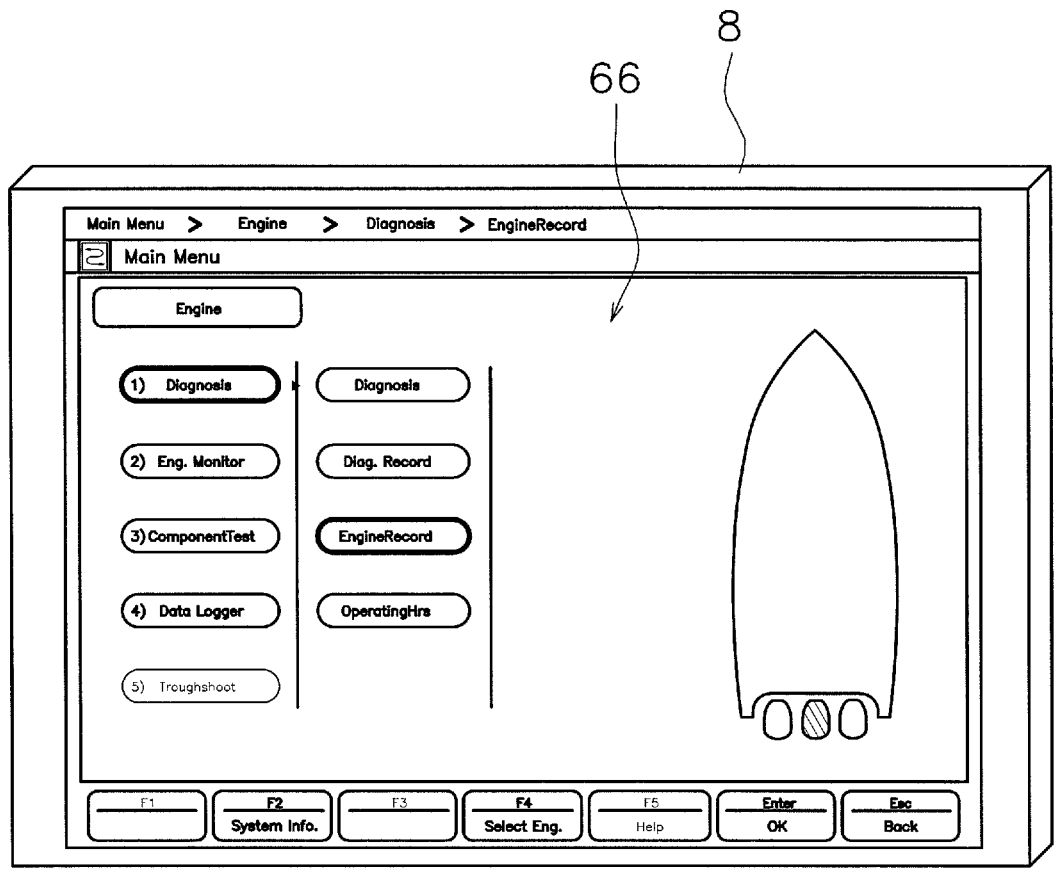
FIG. 17 is a screenshot of a maintenance screen of the watercraft displayed on the display device.

A maintenance program for performing maintenance of the devices is stored in the storage device 73. The central controller 7 can perform maintenance of the devices based on information received from the devices and based on the maintenance program. The display device 8 can display a screen for maintenance of the watercraft 1, and the maintenance program executes, for example, failure diagnostics, maintenance inspections, and settings of the devices. The operator can operate the maintenance program by performing touch operations on the display device 8. FIG. 17 shows a maintenance screen 66 for the watercraft 1 displayed on the display device 8. Each of the first to third engine ECUs 31a to 31c stores an operating record for the engine of the respective first to third watercraft propulsion device 3a to 3c. The engine operation record includes a total operation time of the engine. The engine operation record also includes such information as the throttle opening degree, the intake air pressure, and the rotational speed of the engine that existed when trouble occurred in the engine. The maintenance program performs failure diagnostics of the engines of the first to third watercraft propulsion devices 3a to 3c based on the engine operation records.

With the watercraft 1 according to the present preferred embodiment, the central controller 7 can perform maintenance of the devices using the maintenance program. As a result, such maintenance operations such as failure diagnostics, maintenance inspections, and settings of the devices can be accomplished without connecting a separate computer installed with the maintenance program to each of the first to third watercraft propulsion devices 3a to 3c, as would be the case in a conventional watercraft. Since the central controller 7 is positioned at the center of the device network system of the watercraft 1, the central controller 7 can readily execute diagnostics, maintenance checks, and settings of the entire device network system of the watercraft 1.

Figure 18:
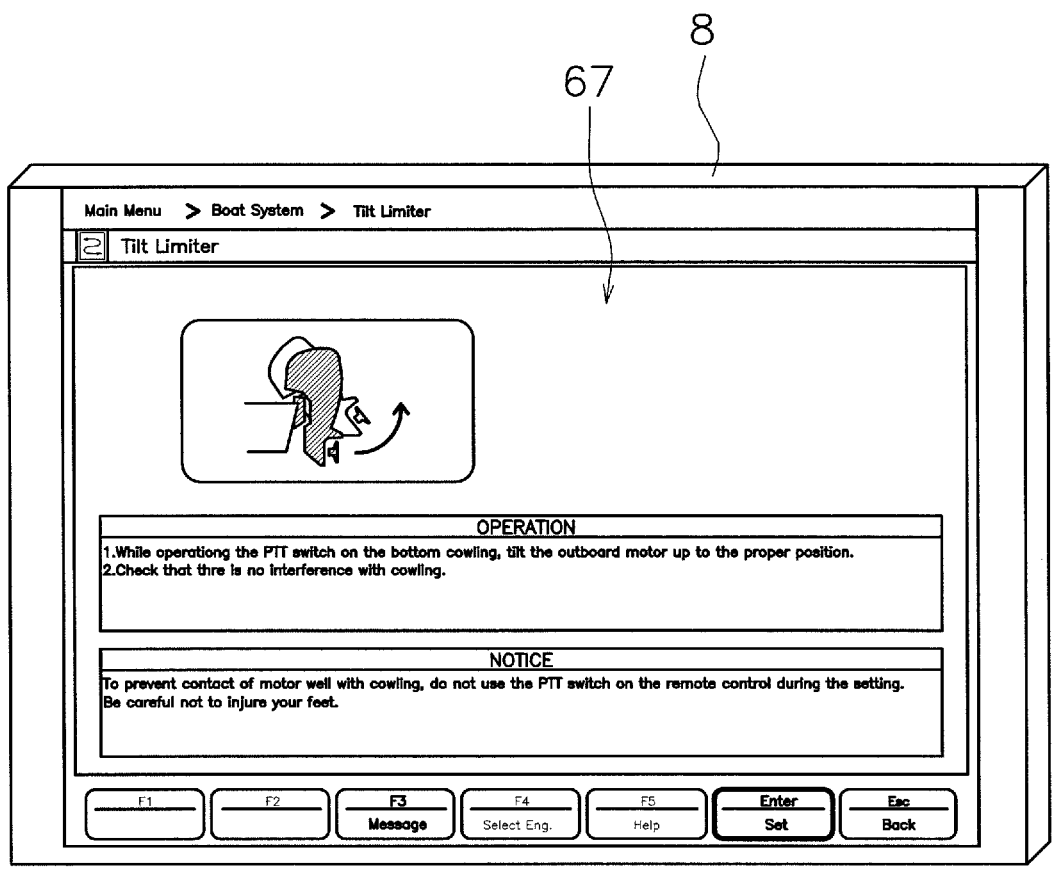
FIG. 18 is a screenshot of a setting screen of the watercraft displayed on the display device.

A settings program for initializing the settings of the devices is stored in the storage device 73. The central controller 7 can initialize the settings of the devices based on the settings program. The display device 8 can display a screen used to initialize the settings of the watercraft 1, and the settings program executes settings such as, for example, position settings of the first to third watercraft propulsion devices 3a to 3c, zero point calibration of the watercraft speedometer 64b, setting the tilt limiter, and an authorization reset of the immobilizer. The position settings of the first to third watercraft propulsion devices 3a to 3c involves setting which of the first to third watercraft propulsion devices 3a to 3c is arranged in each of the starboard, port, and middle positions. The tilt limiter setting sets an upper limit position for tilting up. FIG. 18 shows a tilt limiter setting screen 67. From the tilt limiter setting screen, an operator sets the upper limit position for tilting the watercraft propulsion devices. For example, when the watercraft 1 will be stored in the water, the operator operates the first to third tilt/trim actuators 37a to 37c and tilts the first to third watercraft propulsion devices 3a to 3c upward to the upper limit position. In this way, the propellers of the first to third watercraft propulsion devices 3a to 3c are lifted out of the water. The immobilizer authorization reset is a process that initializes an ID code of an immobilizer receiver 65a explained below. The operator can operate the settings program by performing touch operations on the display device 8.

In a conventional watercraft, the device initialization settings explained above are accomplished using different tools for each of the devices. With the watercraft 1 according to the present preferred embodiment, initialization settings of the devices can be accomplished by the central controller 7. Thus, initialization settings of a plurality of devices can be accomplished in a centralized manner by the central controller 7. As a result, an operator can perform initialization settings of the devices easily. Moreover, different specifications can be accommodated easily by changing the setting program.

It is also acceptable to use the settings program to customize the settings of the devices. For example, settings of the first to third propulsion devices 3a to 3c can be set to achieve a watercraft speed versus engine output torque characteristic in accordance with the operator's preferences. More specifically, a fishing boat operator may prefer a large torque output at a low speed because a fishing boat often carries heavy loads. By customizing the settings of the devices using the setting program, the operator can set the devices as desired.

As shown in FIG. 3, the watercraft 1 is provided with an immobilizer receiver 65a. The immobilizer receiver 65a is arranged in the display device 8. The key held by the operator includes an immobilizer transmitter 65b. The immobilizer receiver 65a receives an ID code stored in the immobilizer transmitter 65b. The central controller 7 determines if the ID code from the immobilizer transmitter 65d matches the ID code of the immobilizer receiver 65a set in advance in the central controller 7. If the ID code of the immobilizer transmitter 65b does not match the ID code set in the central controller 7, then the central controller 7 prohibits the engines of the first to third watercraft propulsion devices 3a to 3c from being started. If the ID code of the immobilizer transmitter 65b does match the ID code set in the central controller 7, then the central controller 7 allows the engines of the first to third watercraft propulsion devices 3a to 3c to be started.

In the watercraft 1 according to the present preferred embodiment, the immobilizer receiver 65a is arranged on the display device 8. Thus, the immobilizer receiver 65a is arranged in a fixed location where it can be seen from the helm seat 4. As a result, the reception sensitivity and reception range of the immobilizer receiver 65a can be stabilized.

The central controller 7 determines a water depth based on a signal from the sonar 53. The central controller also determines if an obstacle exists in the water based on a signal from the sonar 53. The display device 8 displays information regarding an obstacle in the water based on the signal from the sonar 53. If it detects an obstacle in the water, then the central controller 7 displays a warning on the display device 8.

Figure 19:
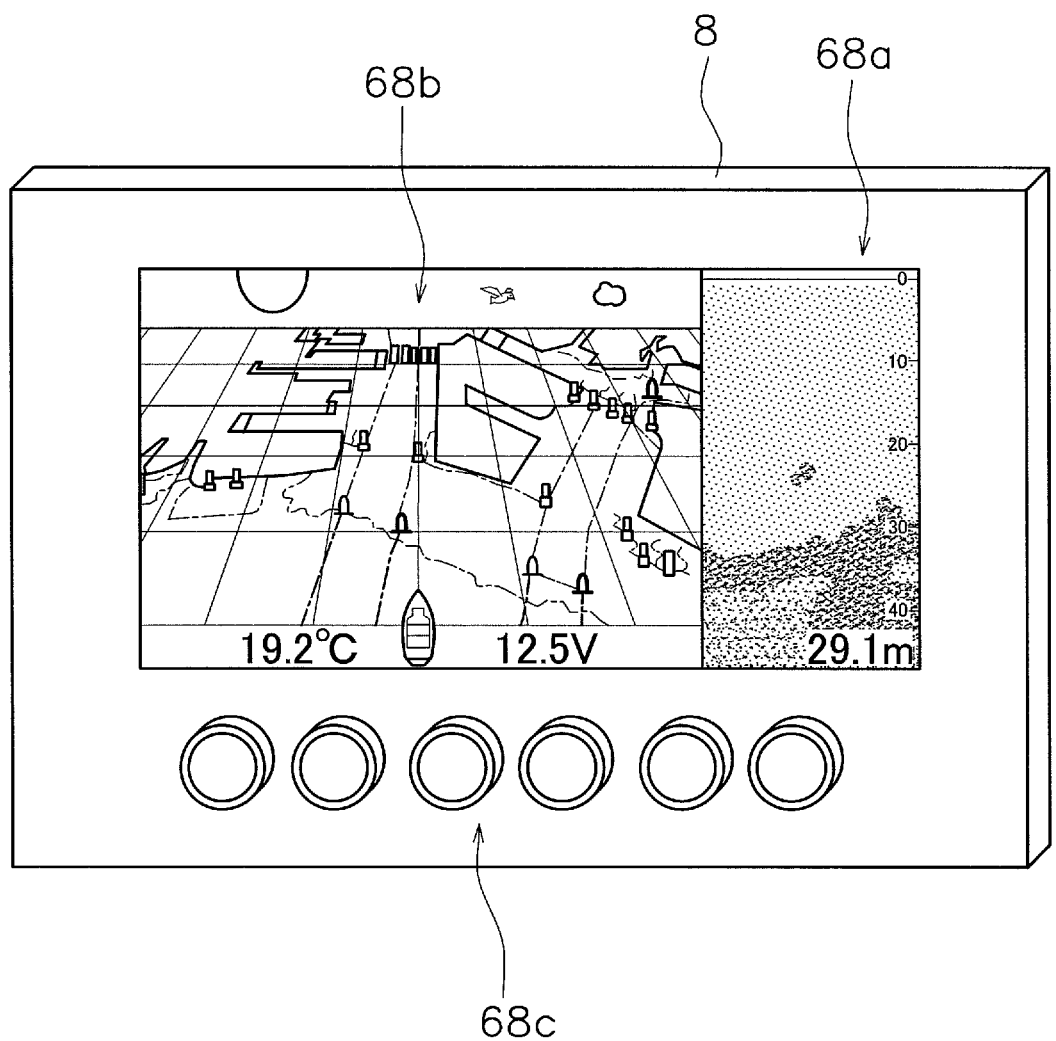
FIG. 19 is a screenshot of a fish finder screen displayed on the display device.

The central controller also displays fish school information on the display device 8 based on the signal from the sonar 53. FIG. 19 shows a screen 68a of the fish finder function displayed on the display device 8. The fish finder screen 68a displays fish school information indicating a position of a fish school in the water below the watercraft 1. Additionally, as shown in FIG. 19, the central controller 7 displays a navigation screen 68b on the display device 8 based on a current position detection signal from the GNSS receiver 62. The navigation screen 68b includes a map indicating the current position of the watercraft 1. Operating buttons 68c for the fish finder function and the navigation function are displayed on the display device 8 as software keys. Although the fish finder screen 68a and the navigation screen 68b are preferably combined into one unit in FIG. 19, it is acceptable to display them separately.

Figure 20:
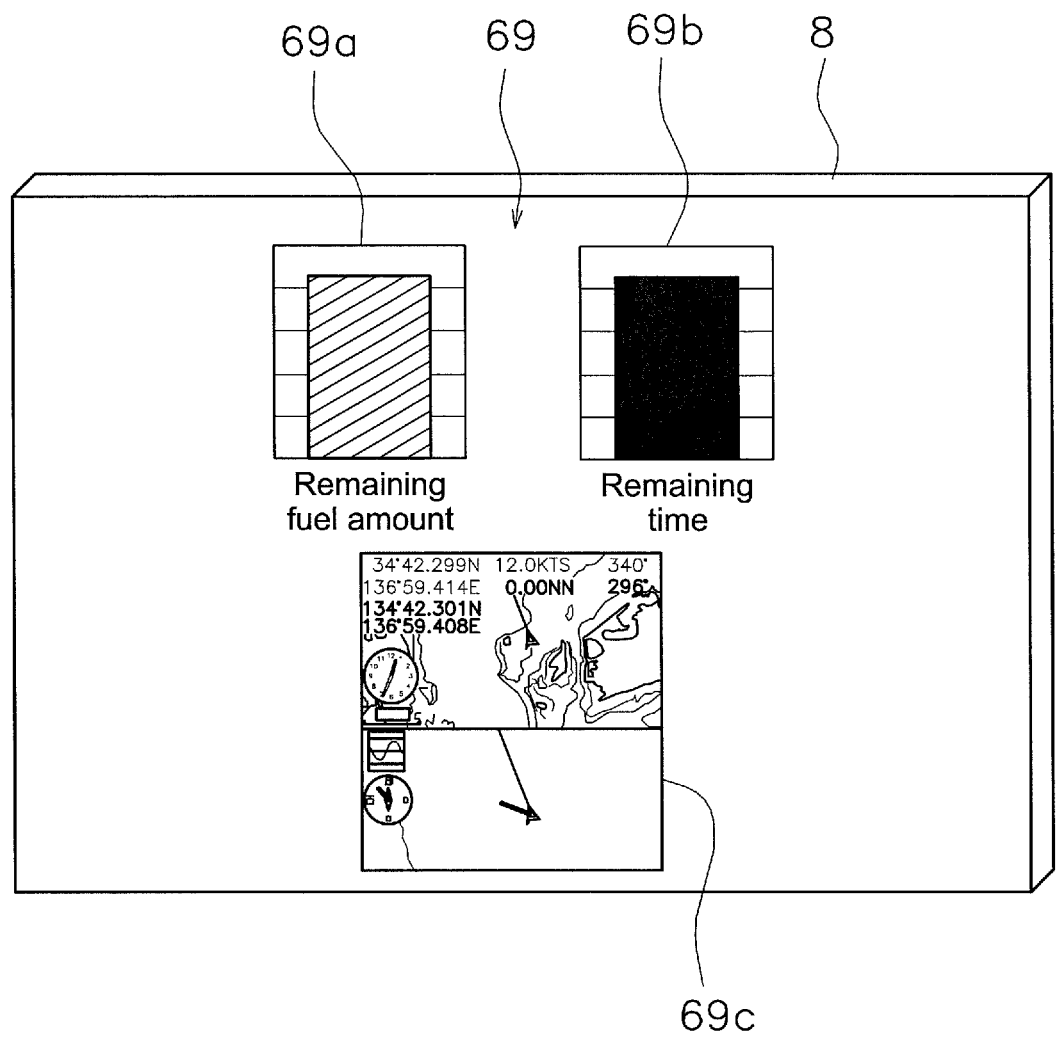
FIG. 20 is a screenshot of a rental management screen displayed on the display device.

In the case of a watercraft 1 used by a boat rental business, it is possible to install a rental management function into the central controller 7. The rental management function displays rental management information regarding the watercraft 1 on the display device 8. The rental management information includes, for example, information regarding an amount of fuel used by the watercraft 1 and information regarding a rental time amount of the watercraft 1. In such a case, the devices of the first additional function system 9 include a fuel flow meter 59a (see FIG. 3). The central controller 7 displays information regarding the amount of fuel used by the watercraft 1 on the display device 8 based on a fuel usage amount measured by the fuel flow meter 59a. FIG. 20 shows a rental management screen 69 displayed on display device 8. The rental management screen 69 contains rental management information. The rental management information includes information 69a indicating the remaining fuel amount and information 69b indicating the remaining rental time. The rental management information also includes position information 69c of the watercraft 1. The position information 69c of the watercraft 1 is acquired by the GNSS receiver 62. The rental management information is transmitted to a computer in a management office of the boat rental business by communicating through the wireless device 63 or the internet. As a result, the rental management information can be utilized for smooth operation of the boat rental business. Also, the operator of the watercraft 1 can contact the management office through the watercraft radio or the internet. In this way, the management office can respond quickly when trouble occurs during a rental of the watercraft 1.

The central controller 7 can connect to the internet. Thus, the central controller 7 can execute various functions through the internet. For example, the central controller 7 can be configured to send and receive email, to send and receive still images and moving images, and to conduct TV phone calls. With these functions, the operator can communicate easily with operators of other vessels. As a result, the operator can communicate information regarding the state of his or her own vessel or information regarding fishing results to the operator of another vessel in real time. The operator can also communicate with the operator of the other vessel using video instead of only audio. It is acceptable for voice communication with the operator of another vessel through a TV phone or the like to be conducted using the aforementioned hands free phones 101 and 102. Instead of connecting to the internet, it is acceptable for voice communication to be conducted using the hands free phones 101 and 102 through the central controller 7 and the wireless device 63.

An operator can download a manual for the watercraft 1 to the central controller 7 by accessing a server of the company that manufactures or sells the watercraft 1 through the internet. The operator can view the downloaded manual using the display device 8. As a result, if trouble occurs during preparation for launching or during operation, the operator can easily refer to the manual.

Figure 21:
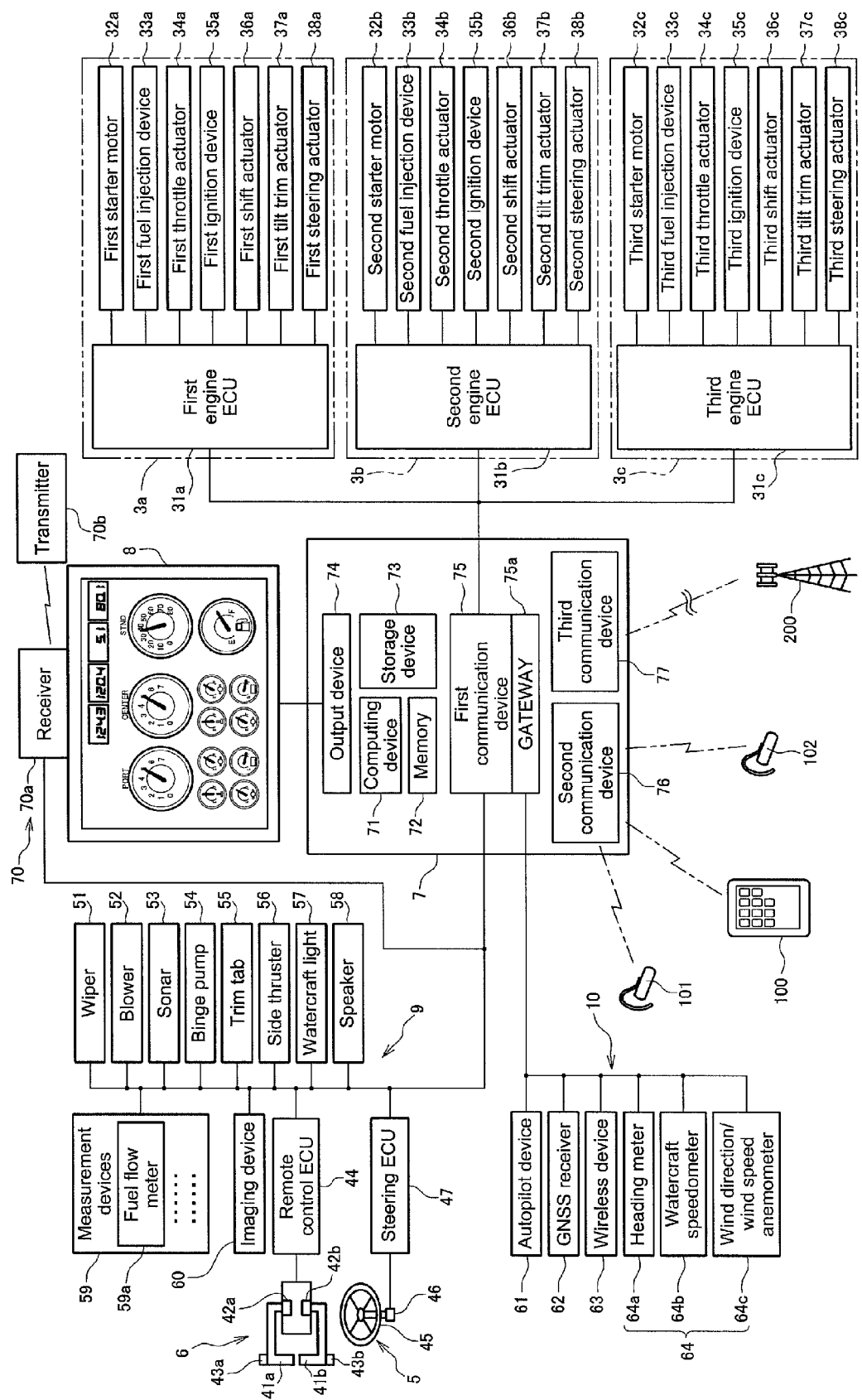
FIG. 21 is a simple diagram showing constituent features of a device network system of a watercraft including a smart key system.

Instead of the aforementioned immobilizer function, it is acceptable to provide a smart key function in the watercraft 1. In such a case, the devices include a smart key system 70 as shown in FIG. 21. The smart key system 70 includes a receiver 70a arranged on the watercraft 1 and a portable transmitter 70b. Similar to the previously explained immobilizer receiver 65a, the receiver 70a is preferably arranged on the display device 8. The central controller 7 determines if the distance between the receiver 70a and the transmitter 70b is equal to or below a prescribed distance. If it determines that the distance between the receiver 70a and the transmitter 70b is equal to or smaller than the prescribed distance, then the central controller 7 allows the engines of the first to third watercraft propulsion devices 3a to 3c to be started and displays start switches (see 86a to 86c in FIG. 9) for the engines of the first to third watercraft propulsion devices 3a to 3c on the display device 8. That is, the start switches are displayed on the display device 8 automatically when the operator holds the transmitter 70b and the operator gets near the helm seat 4 of the watercraft 1. Thus, the operator can start the engines by performing touch operations on the display device 8 without operating the key. As a result, the operator can avoid the trouble of pulling out the key. The operator can also avoid the process of inserting and turning the key. The main switch 85 (see FIG. 9) is also displayed together with the start switches. Thus, if the engines will not be started, the operator can turn the power supply to the entire device network system of the watercraft 1 off manually by operating the main switch 85. It is also acceptable for the main switch 85 to turn on automatically when the distance between the receiver 70a and the transmitter 70b is equal to or smaller than the prescribed distance. Thus, the operator can avoid turning the main switch 85 on.

Figure 22:
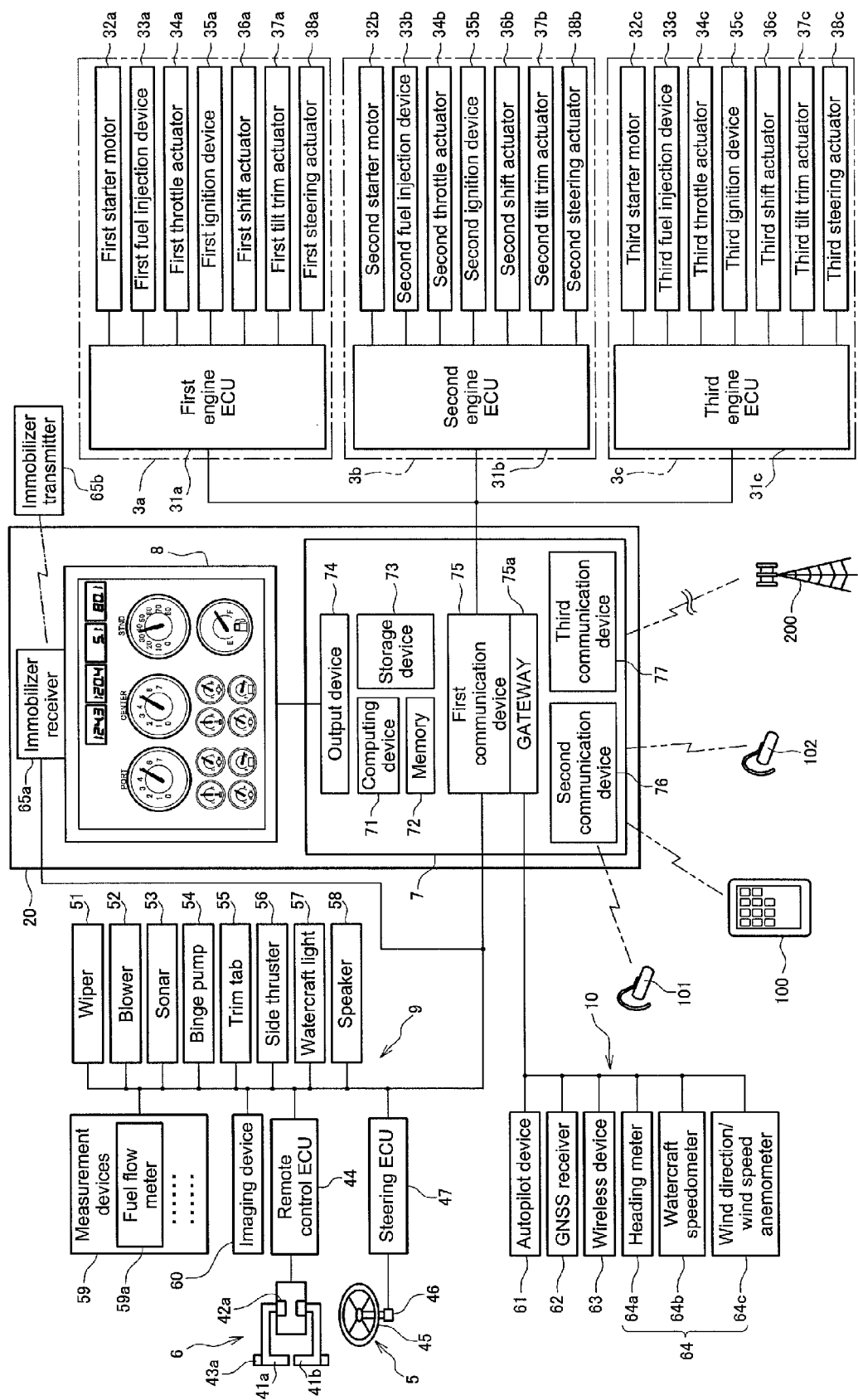
FIG. 22 is a simple diagram showing constituent features of a device network system of a watercraft according to a second preferred embodiment of the present invention.

FIG. 22 is simple diagram showing constituent features of a device network system installed in a watercraft 1 according to another preferred embodiment of the present invention. This device network system includes a central control unit 20. The central control unit 20 is a device in which the central controller 7 and the display device 8 of the first preferred embodiment are preferably integrated into a single unit. That is, the central control unit 20 includes a common case for the central controller 7 and the display device 8. The central controller 7 and the display device 8 are both housed in this case. Otherwise, the constituent features of the watercraft according to the present preferred embodiment are preferably the same as the watercraft 1 according to the first preferred embodiment.

Although preferred embodiments of the present invention are explained herein, the present invention is not limited to these preferred embodiments. Various changes can be made without departing from the scope of the present invention.

Figure 23:
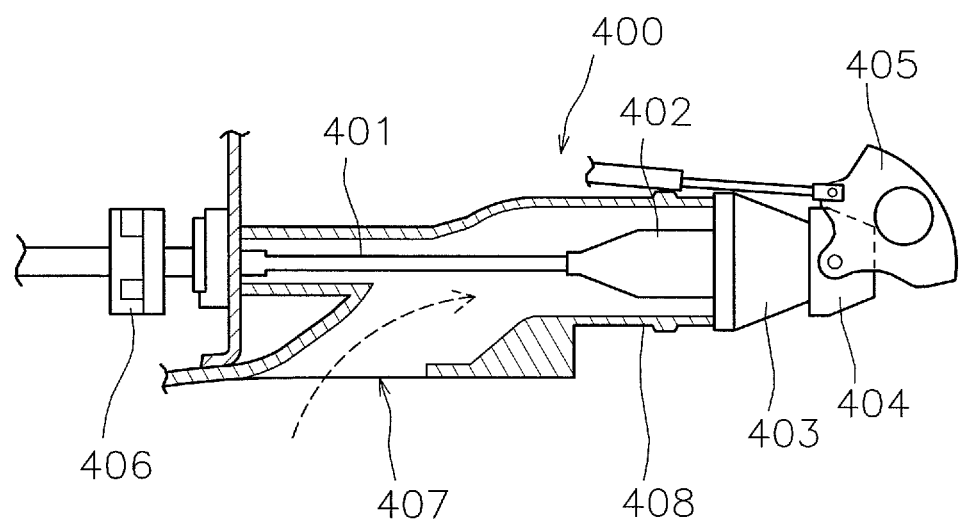
FIG. 23 is a side cross sectional view showing the structure of a water jet propulsion device according to another preferred embodiment of the present invention.
Figure 24:
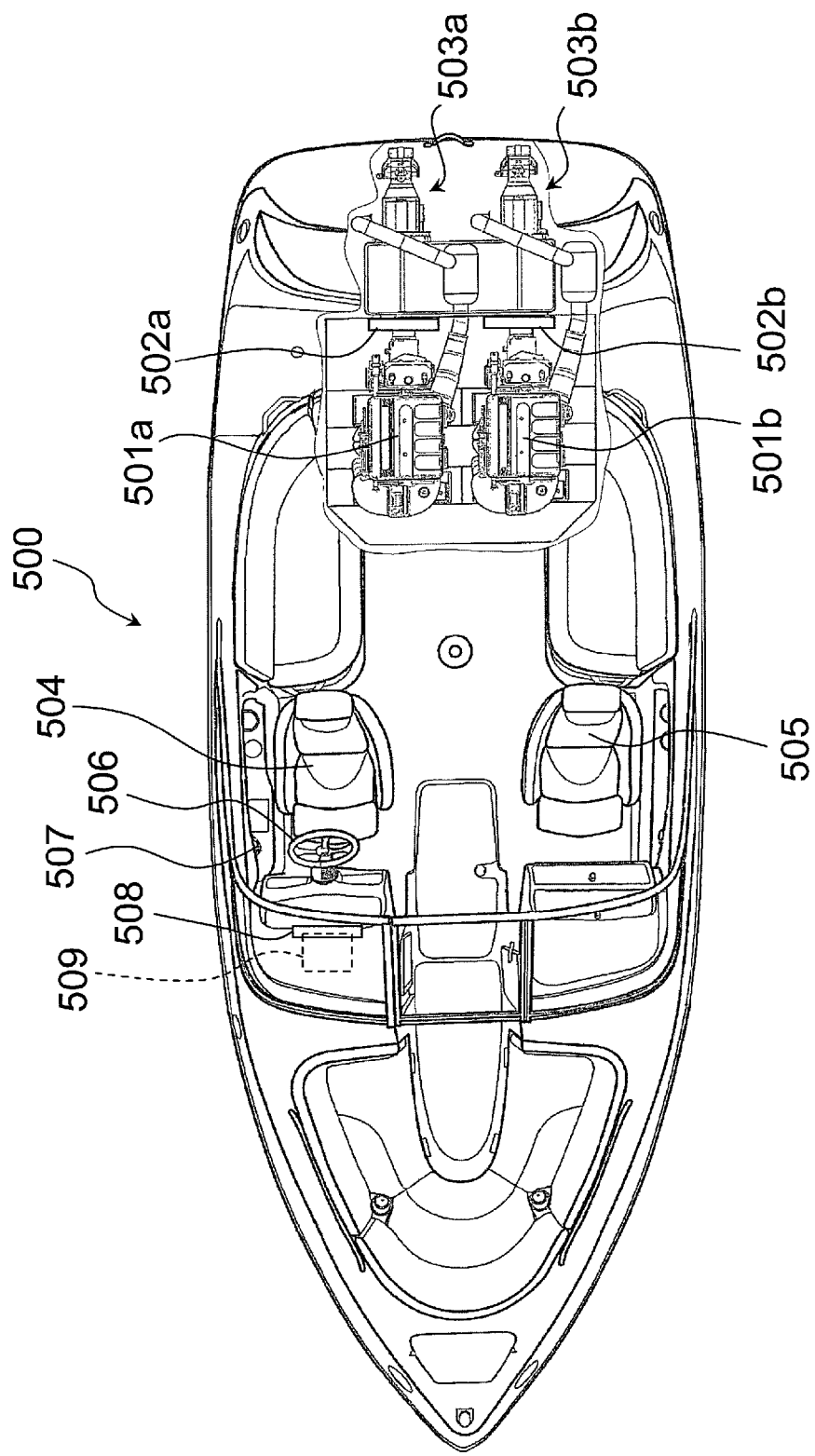
FIG. 24 is a plan view of a sport boat according to another preferred embodiment of the present invention.

It is acceptable for the watercraft propulsion devices to be inboard motors or water jet propulsion devices instead of outboard motors. FIG. 23 is a side cross sectional view showing the structure of a water jet propulsion device 400. The water jet propulsion device 400 is driven by an engine or other power source and draws in water from around the watercraft. As shown in FIG. 23, the water jet propulsion unit 400 includes an impeller shaft 401, an impeller 402, a nozzle 403, a deflector 404, and a reverse bucket 405. A frontward portion of the impeller shaft 401 is coupled to an output shaft of the power source (not shown) through a coupling section 406. A rearward portion of the impeller shaft 401 passes through a water suction section 407 of the watercraft and out through the inside of the impeller housing 408. The impeller housing 408 is connected to a rearward portion of the water suction section 407. The nozzle 403 is arranged rearward of the impeller housing 408. The impeller 402 is attached to a rearward portion of the impeller shaft 401. The impeller 402 is arranged inside the impeller housing 408. The impeller 402 rotates together with the impeller shaft 401 and draws in water from the water suction section 407. The impeller 402 jets the drawn water rearward from the nozzle 403. The deflector 404 is arranged rearward of the nozzle housing 403. The deflector 404 is configured to change a movement direction of water jetted from the nozzle 403 to a leftward or a rightward direction. The reverse bucket 405 is arranged rearward of the deflector 404. The reverse bucket 405 is arranged to change the movement direction of water jetted from the nozzle 403 and the deflector 404 to a frontward direction. It is acceptable if the watercraft is a sport boat or a PWC (personal watercraft) equipped with a water jet propulsion device. FIG. 24 is a plan view of a sport boat 500. The sport boat 500 includes a first engine 501a, a first engine ECU 502a, a first water jet propulsion device 503a, a second engine 501b, a second engine ECU 502b, and a second water jet propulsion device 503b. The first water jet propulsion device 503a is driven by the first engine 501a. The first engine ECU 502a controls the first engine 501a. The second water jet propulsion device 503b is driven by the second engine 501b. The second engine ECU 502b controls the second engine 501b. The constituent features of the first and second engines 501a and 501b and the first and second engine ECU's 502a and 502b are substantially the same as the constituent features of the engine 12a and the first engine ECU 31a of the previously explained first preferred embodiment. The first and second water jet propulsion devices 503a and 503b include the same constituent features as the previously explained water jet propulsion device 400. The sport boat 500 includes a driver's seat 504 and a passenger seat 505. A steering operating member 506 is arranged frontward of the driver's seat 504. A remote control device 507 is arranged to a side of the driver's seat 504. The constituent features of the steering operating member 506 and the remote control device 507 are substantially the same as the constituent features of the steering operating member 45 and the remote control device 6 of the first preferred embodiment. A display device 508 and a central controller 509 are arranged frontward of the driver's seat 504. The central controller 509 executes centralized control of devices installed on the sport boat 500. For example, the central controller 509 communicates with the first and second engine ECUs 502a and 502b and controls the first engine 501a and the second engine 501b. The central controller 509 controls the first water jet propulsion device 503a and the second water jet propulsion device 503b. The display device 508 communicates with the central controller 509 to display information regarding sport boat 500 in a GUI format. The constituent features of the display device 508 and the central controller 509 are substantially the same as the constituent features of the display device 8 and the central controller 7 of the first preferred embodiment.

Figure 25:
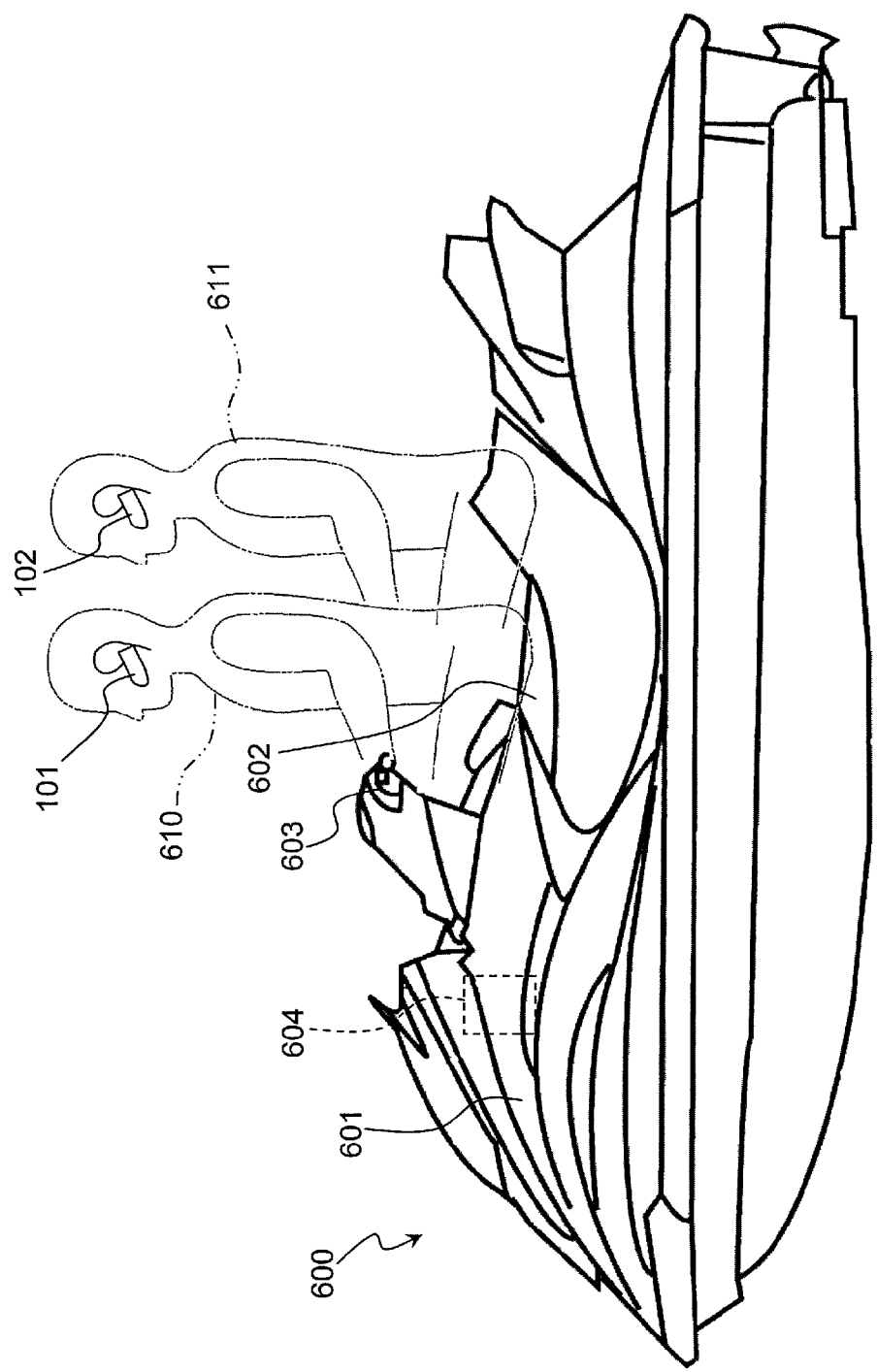
FIG. 25 is a side view of a PWC according to another preferred embodiment of the present invention.

FIG. 25 is a side view of a PWC 600. As shown in FIG. 25, the PWC 600 includes a watercraft body 601, a seat 602, an operating handle 603, and a central controller 604. The watercraft body 601 houses an engine and a jet propulsion device that are not shown in the drawing. The seat 602 is attached to the watercraft body 601. The operating handle 603 is arranged frontward of the seat 602. One passenger 610 riding the PWC 600 can use a hands free phone 101 (see FIG. 3) to converse comfortably with another passenger 611 wearing another hands free phone 102 (see FIG. 3). As shown in FIG. 25, the hands free phone 102 is worn by a passenger 611 sitting on a rearward portion of the seat 602 of the same PWC 600. It is also acceptable for the hands free phone 102 to be worn by a passenger on another PWC.

Although in the previously explained preferred embodiments the watercraft 1 preferably includes three watercraft propulsion devices 3a to 3c, the number of watercraft propulsion devices is not limited to three. It is acceptable to equip the watercraft with two or fewer watercraft propulsion devices or with four or more watercraft propulsion devices, for example. Although in the previously explained preferred embodiments an engine was used preferably as the power source, it is acceptable to use an electric motor as the power source.

In the first preferred embodiment, it is acceptable for the display device 8 to be detachable from the central controller 7. In such case, it is preferable for the display device 8 to be able to communicate with the central controller 7 through a wireless communication interface, such as a wireless LAN or Bluetooth. In this way, the devices of the watercraft 1 can be operated from outside the watercraft 1. For example, an operator on land can pilot the watercraft 1 remotely using the same software key function as previously explained above. An operator can also pilot the watercraft 1 from a place within the watercraft 1 other than the helm seat 4.

In the previously explained preferred embodiments, the central controller 7 and the devices are preferably connected with a communication line. However, it is acceptable to connect the central controller 7 and the devices wirelessly. For example, it is acceptable for a wireless communication interface (e.g., a wireless LAN) to be provided between the central controller 7 and each of the first to third engine ECUs 31a to 31c such that data is exchanged wirelessly. In such a case, the number of wires can be reduced because a communication harness can be omitted. As a result, the rigging can be simplified. It is also acceptable for the communication between the central controller 7 and the devices to be accomplished using analog signals. It is also acceptable for the central controller 7 to communicate with the devices through wired connections using a protocol such as CAN or NMEA. It is also acceptable for the central controller 7 to communicate with the devices wirelessly using, for example, a wireless LAN.

In the previously explained preferred embodiments, each of the devices is equipped with a controller and the central controller 7 communicates with the controllers of the devices. However, it is also acceptable for the central controller 7 to serve as the controllers of the devices. For example, it is acceptable for the central controller 7 to also function as the remote control ECU 44. It is also acceptable for the central controller 7 to function as the steering ECU 47.

Although in the previously explained preferred embodiments the central controller 7 includes a fish finder function that uses a detection signal from the sonar 53, it is acceptable to provide a fish finder device separate from the sonar 53. In such a case, the central controller 7 would communicate with a controller of the fish finder device.

Although in the previously explained preferred embodiments the central controller 7 can connect to the internet preferably through the third communication device 77, it is acceptable if the central controller 7 can connect to the internet through the mobile terminal 100. For example, it is acceptable for the central controller 7 to use a tethering function of the mobile terminal 100 to connect to the internet.

Regarding the function of communicating using external devices, it is acceptable to omit the previously explained display device 8 because it is not mandatory.

It is acceptable for the central controller 7 to control movement of the watercraft 1 based on touch panel operations performed on the mobile terminal 100. In such a case, the mobile terminal 100 displays software keys in the same manner as explained above. The operator can control movements of the watercraft 1 by operating the software keys displayed on the screen of the mobile terminal 100.

It is acceptable for the central controller 7 to control movement of the watercraft 1 based on tilting of the mobile terminal 100. If the mobile terminal 100 includes, for example, a gyroscopic sensor, an acceleration sensor, or another sensor that detects tilting, then tilting of the mobile terminal 100 itself can be detected. The mobile terminal 100 transmits a signal indicating the tilt of the mobile terminal 100 to the central controller 7. In response, the central controller 7 controls the side thruster 56 and the first to third watercraft propulsion devices 3a to 3c such that the watercraft 1 moves in the same direction as the tilt direction of the mobile terminal 100. For example, when the mobile terminal 100 is tilted in any of the forward, rearward, rightward, or leftward directions, the central controller 7 controls the side thruster 56 and the first to third watercraft propulsion devices 3a to 3c such that the watercraft 1 moves in the same direction as the tilt direction of the mobile terminal 100. Similarly, when the mobile terminal 100 is tilted such that it rotates rightward or leftward, the central controller 7 controls the side thruster 56 and the first to third watercraft propulsion devices 3a to 3c such that the watercraft 1 rotates in place in the same direction as the rotation direction of the mobile terminal 100.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A watercraft comprising:

a plurality of devices;

a central controller programmed to execute centralized control of the plurality of devices; and display device that performs a touch panel function; wherein the display device communicates with the central controller and displays information regarding the watercraft in a Graphical User Interface format;

the plurality of devices includes an imaging device that captures an image of a region surrounding the watercraft and a plurality of engines that generate power to propel the watercraft;

the central controller includes a transmitter programmed to transmit electronic data of the image to a car navigation system installed in an automobile that is towing the watercraft;

the central controller is programmed to process the image of the region surrounding the watercraft captured by the imaging device, to synthesize a bird's eye view showing the watercraft from above, and to transmit the electronic data of the bird's eye view image to the car navigation system;

the display device displays software keys including a main switch and a plurality of start/stop switches on a same screen; and the main switch turns on and off a power source that powers a device network system when the main switch is slid, and the plurality of start/stop switches start and stop the plurality of engines when the plurality of start/stop switches are tapped.

2. The watercraft according to claim 1, wherein the central controller is programmed to transmit an image showing a perimeter of the watercraft to the car navigation system.

3. The watercraft according to claim 1, wherein the central controller is programmed to transmit an image showing a region rearward of the watercraft to the car navigation system.

* * * * *